United States Patent
Iketani

(10) Patent No.: US 9,324,135 B2
(45) Date of Patent: Apr. 26, 2016

(54) IMAGE PROCESSING SYSTEM, IMAGE PROCESSING METHOD, AND IMAGE PROCESSING PROGRAM

(75) Inventor: Akihiko Iketani, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 137 days.

(21) Appl. No.: 13/881,303

(22) PCT Filed: Jan. 16, 2012

(86) PCT No.: PCT/JP2012/000220
§ 371 (c)(1),
(2), (4) Date: Apr. 24, 2013

(87) PCT Pub. No.: WO2012/098854
PCT Pub. Date: Jul. 26, 2012

(65) Prior Publication Data
US 2013/0223756 A1     Aug. 29, 2013

(30) Foreign Application Priority Data

Jan. 20, 2011 (JP) ................................. 2011-009837

(51) Int. Cl.
*G06T 5/00* (2006.01)
*H04N 1/393* (2006.01)
*H04N 1/409* (2006.01)
(Continued)

(52) U.S. Cl.
CPC ................. *G06T 5/001* (2013.01); *G06T 5/002* (2013.01); *G06T 5/20* (2013.01); *H04N 1/393* (2013.01); *H04N 1/3935* (2013.01); *H04N 1/409* (2013.01); *H04N 1/4092* (2013.01); *H04N 5/142* (2013.01); *H04N 7/012* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS 6,226,050 B1 * 5/2001 Lee .............................. 348/607
6,707,940 B1 * 3/2004 Qian ............................ 382/173
(Continued)

FOREIGN PATENT DOCUMENTS

| CN | 1377008 A | 10/2002 |
| CN | 1708108 A | 12/2005 |

(Continued)

OTHER PUBLICATIONS

Communication dated Feb. 9, 2015 from the State Intellectual Property Office of the People's Republic of China in counterpart Application No. 201280003936.9.

(Continued)

*Primary Examiner* — Jingge Wu
(74) *Attorney, Agent, or Firm* — Sughrue Mion, PLLC

(57) ABSTRACT

There is provided an image processing system which can remove jaggies not only from binary images but also from gray scale images, color images and images upscaled by an unknown scaler. When the center pixel of the local area clipped from a processing target image is decided to be the jaggy removal target pixel, a base filter computing means 84 applies a plurality of types of predetermined base filters to the local area. A weight calculating means 85 calculates weights with respect to the plurality of types of base filters based on the feature amount calculated by a principal component analyzing means 82. Based on a filtering result of each base filter and a weight with respect to each base filter, a filtering result weight computing means 86 updates a pixel value of the center pixel.

4 Claims, 18 Drawing Sheets

(51) Int. Cl.
*H04N 5/14* (2006.01)
*H04N 7/01* (2006.01)
*G06T 5/20* (2006.01)

(56) References Cited

U.S. PATENT DOCUMENTS

| | | | |
|---|---|---|---|
| 6,792,159 B1* | 9/2004 | Aufrichtig et al. | 382/260 |
| 2005/0276506 A1* | 12/2005 | Kwon et al. | 382/269 |
| 2006/0291741 A1 | 12/2006 | Gomi et al. | |
| 2008/0118179 A1* | 5/2008 | Jeong et al. | 382/275 |
| 2008/0199099 A1* | 8/2008 | Michel et al. | 382/260 |
| 2010/0027906 A1 | 2/2010 | Hara et al. | |
| 2010/0232697 A1* | 9/2010 | Mishima et al. | 382/168 |
| 2011/0235938 A1* | 9/2011 | Lin | 382/264 |

FOREIGN PATENT DOCUMENTS

| | | |
|---|---|---|
| EP | 2149860 A1 | 2/2010 |
| JP | 6-223180 A | 8/1994 |
| JP | 9-270915 A | 10/1997 |
| JP | 2000-293677 A | 10/2000 |
| JP | 2006-221403 A | 8/2006 |
| JP | 2008-167027 A | 7/2008 |
| JP | 2009-010880 A | 1/2009 |
| JP | 2009-237650 A | 10/2009 |
| JP | 2010-057157 A | 3/2010 |

OTHER PUBLICATIONS

Communication dated Oct. 19, 2015 from the State Intellectual Property Office of the People's Republic of China in counterpart application No. 201280003936.9.

* cited by examiner

FIG. 3
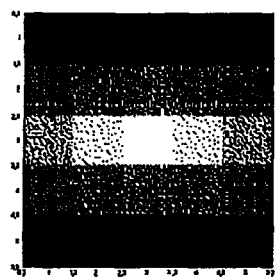
BASE FILTER $G_1$
($\theta_1 = 0°$)
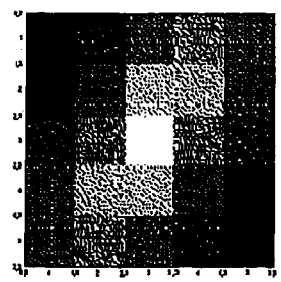
BASE FILTER $G_2$
($\theta_2 = 60°$)
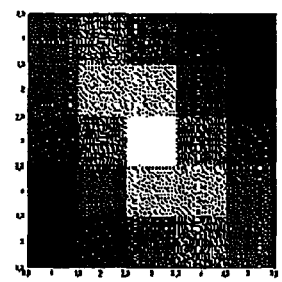
BASE FILTER $G_3$
($\theta_3 = 120°$)

FIG. 8
(a)
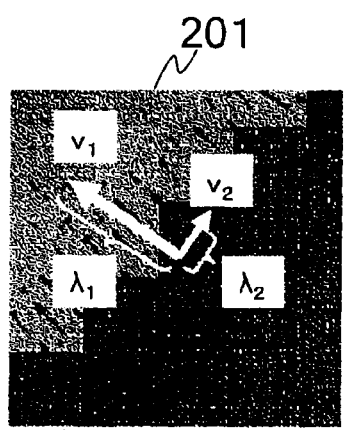
$\lambda_1$: HIGH
$\lambda_2$: SMALL
(b)
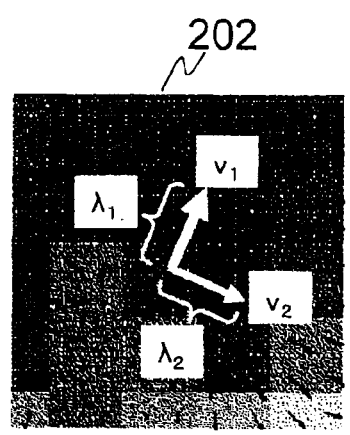
$\lambda_1$: HIGH
$\lambda_2$: HIGH

IMAGE PROCESSING SYSTEM, IMAGE PROCESSING METHOD, AND IMAGE PROCESSING PROGRAM

CROSS REFERENCE TO RELATED APPLICATIONS

This application is a National Stage of International Application No. PCT/JP2012/000220 filed Jan. 16, 2012, claiming priority based on Japanese Patent Application No. 2011-009837, filed Jan. 20, 2011, the contents of all of which are incorporated herein by reference in their entirety.

TECHNICAL FIELD

The present invention relates to an image processing system, an image processing method and an image processing program and, more particularly, relates to an image processing system, an image processing method and an image processing program which can remove jaggies in images.

BACKGROUND ART

When images are upscaled or interlace video images are made progressive, stepwise patterns which are referred to as "jaggies" are produced at edge portions in images. For example, image processing methods of removing these jaggies are variously proposed (see, for example, Patent Literatures 1 and 2).

The image processing methods disclosed in Patent Literatures 1 and 2 include sequentially selecting each pixel of an input image as a pixel of interest. Further, by extracting an area (window) around this pixel of interest and comparing (in other words, pattern matching) the area and a jaggy pattern prepared in advance, whether or not the pixel is a jaggy pixel is decided. When this pixel is a jaggy pixel, a jaggy correction pattern prepared in advance is read, and is added to a portion corresponding to the jaggies of the input image to remove the jaggies.

Further, Patent Literature 3 discloses an image processing device which defines a filter and prevents jaggies. The image processing device disclosed in Patent Literature 3 detects a brightness gradient of a predetermined range around a pixel of interest. Further, the image processing device detects an edge gradient direction $v_1$ which is a direction in which a gradient of a pixel value is the greatest and an edge direction $v_2$ which is a direction which is orthogonal to the edge gradient direction $v_1$ in the pixel of interest. Furthermore, the image processing device detects eigenvalues $\lambda_1$ and $\lambda_2$ which each indicate a dispersion of a gradient of each pixel value in the edge gradient direction $v_1$ and the edge direction $v_2$. Still further, the image processing device disclosed in Patent Literature 3 detects reliability of an edge based on $\lambda_2/\lambda_1$, and generates a parameter p matching the reliability. Further, the parameter q a value of which changes according to a rising of the edge is generated based on a fact that contrast is significant across the edge and the edge is clear when the eigenvalue $\lambda_1$ is great. Furthermore, the image processing device disclosed in Patent Literature 3 calculates a range of filtering processing based on p and q, switches the number of taps of the filtering processing based on the range and defines a filter.

That is, the image processing device disclosed in Patent Literature 3 defines a filter which prevents jaggies in a predetermined range related to each pixel of interest in an image.

CITATION LIST

Patent Literatures

PLT 1: Japanese Patent Application Laid-Open No. 9-270915 (paragraphs [0034] to [0040])
PLT 2: Japanese Patent Application Laid-Open No. 2009-10880 (paragraphs [0054] to [0057] and FIG. 10)
PLT 3: Japanese Patent Application Laid-Open No. 2006-221403 (paragraphs [0024] to [0026] and [0046] to [0053])

SUMMARY OF INVENTION

Technical Problem

The methods disclosed in Patent Literatures 1 and 2 as the image processing methods of removing the jaggies need to prepare in advance jaggy patterns used for pattern matching and jaggy correction patterns for correcting a portion corresponding to the jaggies. Therefore, images from which jaggies can be removed are limited to images for which jaggy patterns or jaggy correction patterns can be prepared in advance, and the image processing methods disclosed in Patent Literatures 1 and 2 cannot be applied to the images for which jaggy patterns and jaggy correction patterns cannot be exhaustively prepared.

For example, jaggy patterns of binary images are limited, and these jaggy patterns and the jaggy correction patterns corresponding to these jaggy patterns can be prepared. Consequently, jaggies in a binary image can be removed by the methods disclosed in Patent Literatures 1 and 2. Meanwhile, there are various jaggy patterns of gray scale images and color images, and therefore it is difficult to exhaustively prepare in advance these jaggy patterns and jaggy correction patterns corresponding to these jaggy patterns. Hence, it is difficult to remove jaggies in gray scale images and color images by the methods disclosed in Patent Literatures 1 and 2.

Further, for example, jaggy patterns are limited for images upscaled by a known scaler, and these jaggy patterns and jaggy correction patterns corresponding to these jaggy patterns can be prepared. Consequently, it is possible to remove jaggies in images upscaled by a known scaler by the methods disclosed in Patent Literatures 1 and 2. However, jaggies can be removed only from images processed by a known scaler. What jaggies are produced upon upscale depends on a scaler. Therefore, it is difficult to exhaustively prepare in advance jaggy patterns and jaggy correction patterns corresponding to the jaggy patterns for all scalers, and it is not possible to remove all jaggies in images upscaled by an arbitrary scaler.

Meanwhile, the image processing device disclosed in Patent Literature 3 does not require jaggy patterns and jaggy correction patterns prepared in advance, and does not cause the above problem that images which can be processed are limited.

However, the image processing device disclosed in Patent Literature 3 performs processing of defining a filter with respect to a predetermined range of each pixel of interest in a processing target image, and requires a longer processing time.

It is therefore an object of the present invention to provide an image processing system, an image processing method and an image processing program which can remove jaggies not only from binary images but also from gray scale images, color images and images upscaled by an unknown scaler. Further, an object of the present invention is to provide an image processing system, an image processing method and an image processing program which can remove jaggies from these images at a high speed.

Solution to Problem

An image processing system according to the present invention has: a brightness gradient calculating means which calculates a brightness gradient of each pixel in a local area clipped from a processing target image; a principal component analyzing means which analyzes a principal component of the brightness gradient of each pixel in the local area, and calculates a feature amount which represents a distribution of brightness gradients; a target pixel deciding means which, based on a brightness gradient of a center pixel of the local area and the feature amount calculated by the principal component analyzing means, decides whether or not the center pixel is a jaggy removal target pixel; a base filter computing means which, when the center pixel of the local area is decided to be the jaggy removal target pixel, applies a plurality of types of predetermined base filters to the local area; a weight calculating means which calculates a weight with respect to the plurality of types of base filters based on the feature amount calculated by the principal component analyzing means; and a filtering result weight computing means which, based on a result that the plurality of types of base filters is applied to the local area and the weight with respect to the plurality of types of base filters, determines a pixel value of a pixel which is included in a corrected image created as an image by correcting a processing target image and which corresponds to the center pixel of the local area.

Further, the image processing system according to the present invention has: a brightness gradient calculating means which calculates a brightness gradient of each pixel in a local area clipped from a processing target image; a principal component analyzing means which analyzes a principal component of a brightness gradient of each pixel in the local area, and calculates a first eigenvector which represents a dominant brightness gradient direction in the local area and a second eigenvector which is vertical to the first eigenvector as the feature amount which represents the distribution of brightness gradients; a target pixel deciding means which, based on a brightness gradient of a center pixel of the local area and the feature amount calculated by the principal component analyzing means, decides whether or not the center pixel is a jaggy removal target pixel; a filter coefficient calculating means which, when the center pixel of the local area is decided to be the jaggy removal target pixel, calculates a coefficient of a blur filter which makes a degree of blur in the direction of the second eigenvector more significant than a degree of blur in a direction of the first eigenvector; and a filter computing means which, by applying the blur filter to the local area the center pixel of which is decided to be the jaggy removal target pixel, determines a pixel value of a pixel which is included in a corrected image created as an image by correcting a processing target image and which corresponds to the center pixel of the local area.

Furthermore, an image processing method according to the present invention includes: calculating a brightness gradient of each pixel in a local area clipped from a processing target image; analyzing a principal component of the brightness gradient of each pixel in the local area, and calculating a feature amount which represents a distribution of brightness gradients; based on a brightness gradient of a center pixel of the local area and the feature amount, deciding whether or not the center pixel is a jaggy removal target pixel; when the center pixel of the local area is decided to be the jaggy removal target pixel, applying a plurality of types of predetermined base filters to the local area; calculating a weight with respect to the plurality of types of base filters based on the feature amount; and based on a result that the plurality of types of base filters is applied to the local area and the weight with respect to the plurality of types of base filters, determining a pixel value of a pixel which is included in a corrected image created as an image by correcting a processing target image and which corresponds to the center pixel of the local area.

Still further, the image processing method according to the present invention includes: calculating a brightness gradient of each pixel in a local area clipped from a processing target image; analyzing a principal component of a brightness gradient of each pixel in the local area, and calculating a first eigenvector which represents a dominant brightness gradient direction in the local area and a second eigenvector which is vertical to the first eigenvector as the feature amount which represents the distribution of brightness gradients; based on a brightness gradient of a center pixel of the local area and the feature amount, deciding whether or not the center pixel is a jaggy removal target pixel; when the center pixel of the local area is decided to be the jaggy removal target pixel, calculating a coefficient of a blur filter which makes a degree of blur in a direction of the second eigenvector more significant than a degree of blur in a direction of the first eigenvector; and by applying the blur filter to the local area the center pixel of which is decided to be the jaggy removal target pixel, determining a pixel value of a pixel which is included in a corrected image created as an image by correcting a processing target image and which corresponds to the center pixel of the local area.

Moreover, an image processing program according to the present invention causes a computer to execute: brightness gradient calculation processing of calculating a brightness gradient of each pixel in a local area clipped from a processing target image; principal component analysis processing of analyzing a principal component of the brightness gradient of each pixel in the local area, and calculating a feature amount which represents a distribution of brightness gradients; target pixel decision processing of, based on a brightness gradient of a center pixel of the local area and the feature amount calculated in the principal component analysis processing, deciding whether or not the center pixel is a jaggy removal target pixel; base filter computation processing of, when the center pixel of the local area is decided to be the jaggy removal target pixel, applying a plurality of types of predetermined base filters to the local area; weight calculation processing of calculating a weight with respect to the plurality of types of base filters based on the feature amount calculated in the principal component analysis processing; and filtering result weight computation processing of, based on a result that the plurality of types of base filters is applied to the local area and the weight with respect to the plurality of types of base filters, determining a pixel value of a pixel which is included in a corrected image created as an image by correcting a processing target image and which corresponds to the center pixel of the local area.

Further, the image processing program according to the present invention causes the computer to execute: brightness gradient calculation processing of calculating a brightness gradient of each pixel in a local area clipped from a processing target image; principal component analysis processing of analyzing a principal component of a brightness gradient of each pixel in the local area, and calculating a first eigenvector which represents a dominant brightness gradient direction in the local area and a second eigenvector which is vertical to the first eigenvector as the feature amount which represents the distribution of brightness gradients; target pixel decision processing of, based on a brightness gradient of a center pixel of the local area and the feature amount calculated in the principal component analysis processing, deciding whether or not the center pixel is a jaggy removal target pixel; filter coefficient calculation processing of, when the center pixel of the local area is decided to be the jaggy removal target pixel, calculating a coefficient of a blur filter which makes a degree of blur in a direction of the second eigenvector more significant than a degree of blur in a direction of the first eigenvector; and filter computation processing of, by applying the blur filter to the local area the center pixel of which is decided to be the jaggy removal target pixel, determining a pixel value of a pixel which is included in a corrected image created as an image by correcting a processing target image and which corresponds to the center pixel of the local area.

Advantageous Effects of Invention

The present invention can remove jaggies not only from binary images but also from gray scale images, color images and images upscaled by an unknown scaler.

Further, in case of a configuration of applying a plurality of types of predetermined base filters to a local area when the center pixel of the local area is decided to be a jaggy removal target pixel, it is possible to remove jaggies at a high speed not only from binary images but also from gray scale images, color images and images upscaled by an unknown scaler.

BRIEF DESCRIPTION OF DRAWINGS

[FIG. 3] It depicts a view schematically illustrating three types of base filters of a base filter computing means 21.

[FIG. 8] It depicts a view illustrating a feature amount obtained by analyzing principal components of areas 201 and 202 as local areas illustrated in FIG. 5.

DESCRIPTION OF EMBODIMENTS

Figure 1:
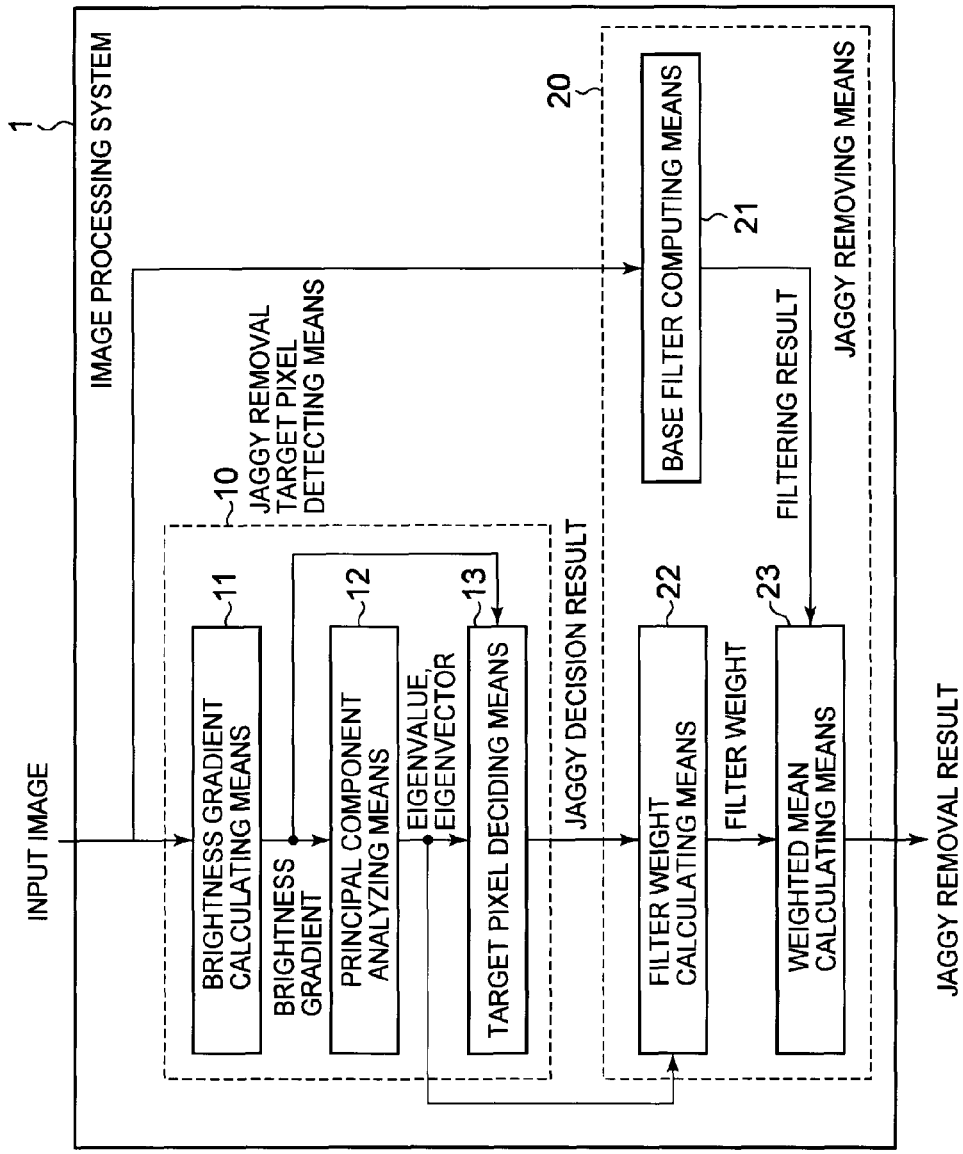
[FIG. 1] It depicts a block diagram illustrating an image processing system according to a first exemplary embodiment of the present invention.

Hereinafter, exemplary embodiments of the present invention will be described with reference to the drawings.
First Exemplary Embodiment
FIG. 1 depicts a block diagram illustrating an image processing system according to a first exemplary embodiment of the present invention. An image processing system 1 according to the present invention is realized by, for example, a computer (a central processing unit, a processor or a data processing device) which operates under control by the program.

The image processing system according to the first exemplary embodiment creates a corrected image corrected by removing jaggies in a processing target image, on, for example, a memory (not illustrated) of the image processing system. For example, the image processing system receives an input of the processing target image, and the image processing system stores duplication of this processing target image in the memory as an initial state of the corrected image. Further, the image processing system determines pixel values of pixels of the corrected image corresponding to jaggy removal target pixels of the processing target image. As a result, a corrected image from which jaggies are removed is obtained.

The image processing system 1 has a jaggy removal target pixel detecting means 10 and a jaggy removing means 20.

The jaggy removal target pixel detecting means 10 analyzes a principal component of a brightness gradient in a local area around each pixel in the processing target image, and calculates an eigenvalue and an eigenvector as feature amounts. Further, the jaggy removal target pixel detecting means 10 statistically decides whether or not a pixel (referred to as a "pixel of interest" below) positioned in the center of the local area is a jaggy removal target pixel, based on the calculated feature amounts. Hereinafter, a pixel which is a removal target of jaggies is referred to as a "jaggy removal target pixel".

The jaggies are significant at a portion at which edges in the same direction continue. By utilizing this property, the jaggy removal target pixel detecting means 10 decides a pixel which has a certain brightness gradient intensity or more and around which there are uniform brightness gradients as a jaggy removal target pixel.

The jaggy removing means 20 applies a plurality of predetermined filters to a local area around the pixel which is decided to be the jaggy removal target pixel. A plurality of these filters is referred to as "base filters". The base filters will be described below. Further, the jaggy removing means 20 calculates a weighted mean of results of applying individual base filters to the local area, and determines the calculation result as a pixel value of a pixel of the corrected image corresponding to the pixel which is decided to be the jaggy removal target pixel. Furthermore, the pixel value of this pixel of the corrected image is updated by a value of this calculation result. Still further, the jaggy removing means 20 calculates a weight coefficient upon calculation of a weighted mean by using the eigenvector calculated by the jaggy removal target pixel detecting means 10.

The jaggy removal target pixel detecting means 10 and the jaggy removing means 20 will be described more specifically.

The jaggy removal target pixel detecting means 10 includes a brightness gradient calculating means 11, a principal component analyzing means 12 and a target pixel deciding means 13.

Figure 2:
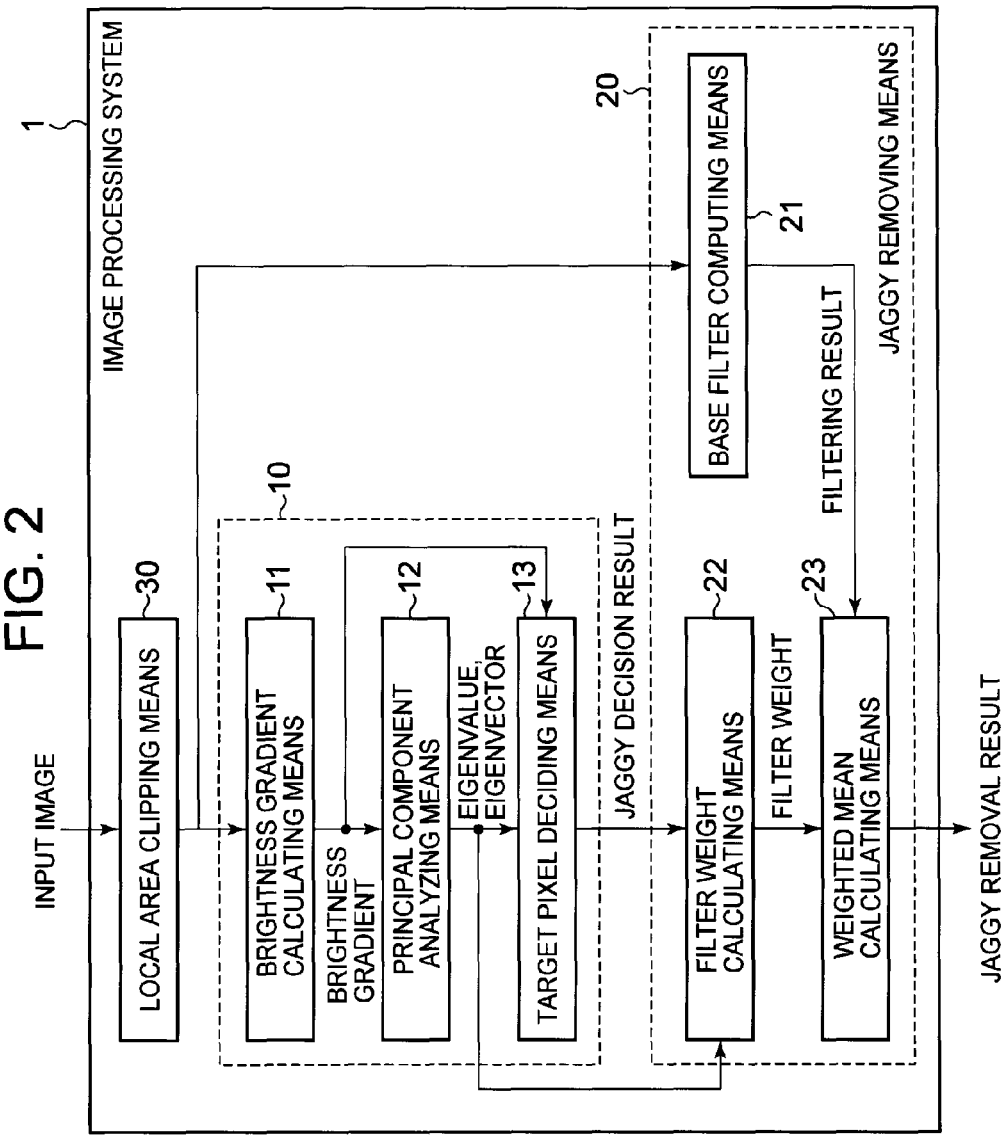
[FIG. 2] It depicts a block diagram illustrating a configuration example including a local area clipping means 30.

When the image processing system 1 receives an input of an input image (processing target image), a local area around each pixel of the input image is clipped and the local area corresponding to each pixel is inputted to the brightness gradient calculating means 11 and the base filter computing means 21. In this case, as illustrated in, for example, FIG. 2, the local area clipping means 30 only needs to be provided which clips the local area around each pixel of the input image and inputs the local area corresponding to each pixel to the brightness gradient calculating means 11 and the base filter computing means 21. Further, processing of extracting a local area per pixel from a processing target image may be performed by an external device, and each local area of the image may be directly inputted to the brightness gradient calculating means 11 and the base filter computing means 21. In addition, as described above, the image processing system 1 stores, for example, duplication of an input image (processing target image) in the memory as an initial state of the corrected image.

In addition, a local area is a square area of k×k elements when, for example, k is an odd number, and a pixel of interest existing in the center can be specified. Although a case has been described above where the local area is a square, the local area is not limited to a square. For example, the local area may be a rectangle.

When the local area is clipped per pixel, the jaggy removal target pixel detecting means 10 (the brightness gradient calculating means 11, the principal component analyzing means 12 and the target pixel deciding means 13) and the jaggy removing means 20 (the base filter computing means 21, the filter weight calculating means 22 and the weighted mean calculating means 23) perform processing per local area.

The brightness gradient calculating means 11 calculates the brightness gradient of each pixel in the inputted local area.

The principal component analyzing means 12 analyzes the principal component of the brightness gradient of each pixel of the local area calculated by the brightness gradient calculating means 11, and calculates the feature amount which represents a distribution of the brightness gradients in the local area. More specifically, the principal component analyzing means 12 analyzes a principal component of the brightness gradient of each pixel of the local area, and calculates two eigenvalues $\lambda_1$ and $\lambda_2$, an eigenvector $v_1$ corresponding to the eigenvalue $\lambda_1$ and the eigenvector $v_2$ corresponding to the eigenvalue $\lambda_2$. Meanwhile, $\lambda_1 > \lambda_2$ is true. Meanwhile, the eigenvector $v_1$ indicates a dominant brightness gradient direction in a local area, and the eigenvector $v_2$ is vertical to the eigenvector $v_1$. Further, $\lambda_1$ and $\lambda_2$ indicate dispersions of gradients in each gradient direction represented by the eigenvectors $v_1$ and $v_2$.

Based on that the brightness gradient of the pixel of interest in the center of the local area is sufficiently high and $\lambda_1$ is sufficiently higher than $\lambda_2$, the target pixel deciding means 13 decides whether or not the pixel of interest in the center of the local area is a jaggy removal target pixel. That is, when conditions that the brightness gradient of the pixel of interest is sufficiently high and $\lambda_1$ is sufficiently higher than $\lambda_2$ are satisfied, the target pixel deciding means 13 decides that this pixel of interest is the jaggy removal target pixel. Further, when the conditions are not satisfied, this pixel of interest is decided not to be a jaggy removal target pixel. In addition, whether or not a brightness gradient is sufficiently high or whether or not $\lambda_1$ is sufficiently higher than $\lambda_2$ are decided using thresholds.

The jaggy removing means 20 includes a base filter computing means 21, a filter weight calculating means 22 and a weighted mean calculating means 23.

The base filter computing means 21 holds in advance a plurality of base filters which defines a blur coefficient such that blur is significant in a specific direction and blur is little in a direction vertical to this specific direction. A case will be described with the present exemplary embodiment as an example where the base filter computing means 21 holds three types of base filters. Further, cases will be described as examples where the above specific directions in the three types of the base filters are 0°, 60° and 120°. Furthermore, these specific directions are represented by rotation angles in a counterclockwise direction based on a horizontal rightward direction. Although the horizontal rightward direction is adopted as a direction of a reference (referred to as a "reference direction" below) for representing the specific direction, another direction may be set as the reference direction.

FIG. 3 depicts a view schematically illustrating three types of base filters of the base filter computing means 21 according to the present exemplary embodiment. The filter is arranged by arranging coefficients equal to or less than the number of pixels in the local area. By associating a coefficient arranged in a center position of the filter and a center pixel of the local area, an arrangement of coefficients in the filter is determined such that each pixel of the local area associated with each coefficient of the filter on a one-on-one basis is specified. The number of coefficients included in the filter is the number of pixels of the local area or less, and only needs to allow a pixel of the local area associated with each coefficient included in the filter on a one-on-one basis to be specified. The number of coefficients included in the filter and the number of pixels of the local area may be equal, and each coefficient and each pixel may be associated on a one-on-one basis. FIG. 3 illustrates the base filters in which 5×5 coefficients are arranged. Meanwhile, when a color is brighter, a value of a filter coefficient is higher.

A specific direction $\theta_1$ in a first base filter $G_1$ illustrated in FIG. 3 is 0°. That is, the base filter $G_1$ of this example is a filter which sets a coefficient such that blur is significant in a 0° direction and blur is little in a direction vertical to this direction.

A specific direction $\theta_2$ of a second base filter $G_2$ is 60°. That is, the base filter $G_2$ of this example is a filter which sets a coefficient such that blur is significant in a 60° direction and blur is little in a direction vertical to this direction.

A specific direction $\theta_3$ of a third base filter $G_3$ is 120°. That is, the base filter $G_3$ of this example is a filter which sets a coefficient such that blur is significant in a 120° direction and blur is little in a direction vertical to this direction.

The specific direction $\theta_2$ of the base filter $G_2$ is obtained by rotating the specific direction $\theta_1$ of the base filter $G_1$ 60° in the counterclockwise direction. Similarly, the specific direction $\theta_3$ of the base filter $G_3$ is obtained by rotating the specific direction $\theta_1$ of the base filter $G_1$ 120° in the counterclockwise direction.

Figure 4:
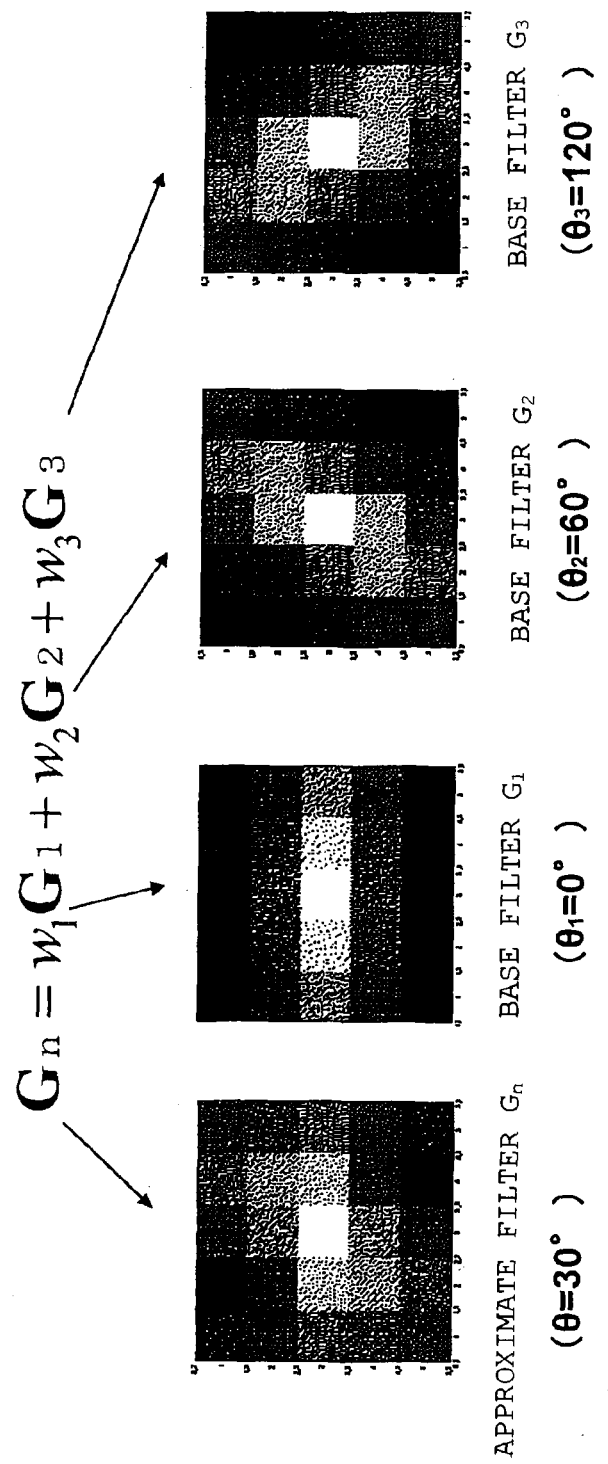
[FIG. 4] It depicts an explanatory view schematically illustrating an example of a filter which is approximated by a linear sum of the base filters.

Although a filter having an arbitrary directionality has a common shape (a coefficient arrangement) similar to the base filters $G_1$ to $G_3$ illustrated in FIG. 3, the filter can be approximated by a linear sum of a plurality of base filters of different directionalities. FIG. 4 depicts an explanatory view schematically illustrating an example of a filter which is approximated by a linear sum of the base filters. FIG. 4 illustrates that a filter $G_n$ a specific direction of which is 30° is approximated by the base filters $G_1$ to $G_3$. Further, upon calculation of this linear sum, weight coefficients with respect to the base filters $G_1$ to $G_3$ are $w_1$, $w_2$ and $w_3$, respectively. In this case, the filter $G_n$ can be approximated according to following equation (1).

$$G_n = w_1 \cdot G_1 + w_2 \cdot G_2 + w_3 \cdot G_3 \quad \text{Equation (1)}$$

When receiving an input of a local area, the base filter computing means 21 individually applies each base filter to this local area. In this example, the base filter computing means 21 individually applies the base filters $G_1$ to $G_3$ to the local area.

As described above, the number of coefficients included in the filter is the number of pixels of the local area or less, and only needs to allow a pixel of the local area associated with each coefficient included in the filter on a one-on-one basis to be specified. In other words, the size of the filter only needs to be the size of the local area or less. To be specific, applying the filter to a local area is performing processing of multiplying the coefficient included in the filter with a pixel value of a pixel of the local area associated with this coefficient per coefficient included in the filter, and calculating the sum of multiplication results. A result (referred to as a "filtering result") obtained by applying a base filter to a local area is this calculation result.

The filter weight calculating means 22 calculates weight coefficients $w_1$ to $w_3$ with respect to the respective base filters $G_1$ to $G_3$ using the eigenvector $v_2$ calculated by the principal component analyzing means 12. A direction of the eigenvector $v_2$ is $\theta$. More specifically, $\theta$ is a rotation angle from the reference direction to the eigenvector $v_2$ in the counterclockwise direction. Although the horizontal rightward direction is adopted as the reference direction in this example as already described above, another direction may be set as the reference direction.

When weight coefficients $w_1$ to $w_3$ with respect to the respective base filters are represented by vector $w=(w_1, w_2, w_3)$, the filter weight calculating means 22 calculates the weight coefficients $w_1$ to $w_3$ by calculating following equation (2) using the direction $\theta$ of the eigenvector $v_2$, the specific direction $\theta_1$ of the base filter $G_1$, the specific direction $\theta_2$ of the base filter $G_2$, and the specific direction $\theta_3$ of the base filter $G_3$.

[Mathematical Formula 1]

$$w = \begin{pmatrix} 1 & 1 & 1 \\ \cos 2\theta_1 & \cos 2\theta_2 & \cos 2\theta_3 \\ \sin 2\theta_1 & \sin 2\theta_2 & \sin 2\theta_3 \end{pmatrix}^{-1} \begin{pmatrix} 1 \\ \cos 2\theta \\ \sin 2\theta \end{pmatrix} \quad \text{Equation (2)}$$

That is, the filter weight calculating means 22 only needs to use three elements of the vector w obtained by calculating equation (2) as the weight coefficients $w_1$, $w_2$ and $w_3$.

The weighted mean calculating means 23 weights three types of filtering results of the base filter computing means 21 with the weight coefficients $w_1$ to $w_3$ calculated by the filter weight calculating means 22, and calculates the sum of the filtering results. That is, by multiplying with $w_1$ a result obtained by applying the base filter $G_1$ to the local area, multiplying with $w_2$ a result obtained by applying the base filter $G_2$ to the local area and multiplying with $w_3$ a result obtained by applying the base filter $G_3$ to the local area, the weighted mean calculating means 23 calculates the sum of these multiplication results. The weighted mean calculating means 23 determines the calculation result as a pixel value of a pixel of a corrected image corresponding to the pixel of interest in the center of this local area. Further, the weighted mean calculating means 23 updates the pixel value of the pixel of the corrected image by a value of the calculation result.

The jaggy removal target pixel detecting means 10 (the brightness gradient calculating means 11, the principal component analyzing means 12 and the target pixel deciding means 13) and the jaggy removing means 20 (the base filter computing means 21, the filter weight calculating means 22 and the weighted mean calculating means 23) are realized by, for example, a computer which operates according to the image processing program. In this case, the computer only needs to read the image processing program, and operate as the jaggy removal target pixel detecting means 10 (the brightness gradient calculating means 11, the principal component analyzing means 12 and the target pixel deciding means 13) and the jaggy removing means 20 (the base filter computing means 21, the filter weight calculating means 22 and the weighted mean calculating means 23) according to this program.

Further, the jaggy removal target pixel detecting means 10 and the jaggy removing means 20 may be realized by different units. Further, the brightness gradient calculating means 11, the principal component analyzing means 12 and the target pixel deciding means 13 may be realized by different units, and the base filter computing means 21, the filter weight calculating means 22 and the weighted mean calculating means 23 may also be realized by different units.

Figure 5:
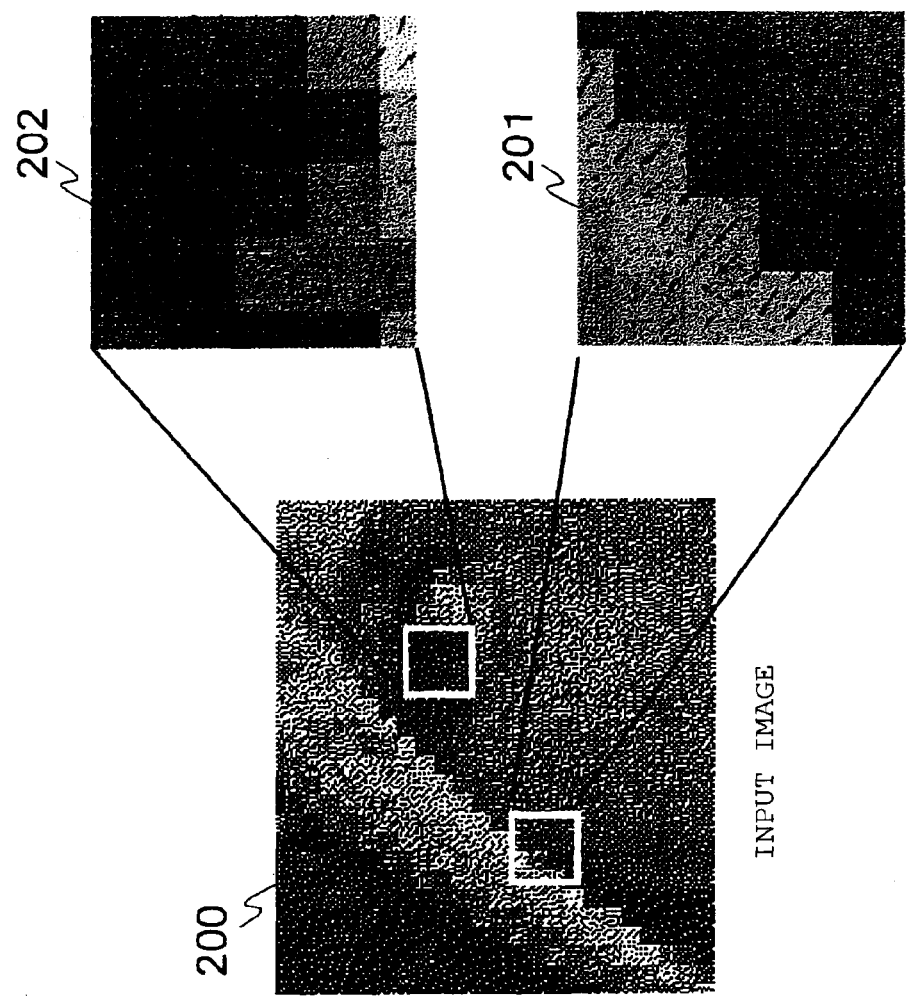
[FIG. 5] It depicts a view illustrating an example of an input image and areas in the input image.
Figure 6:
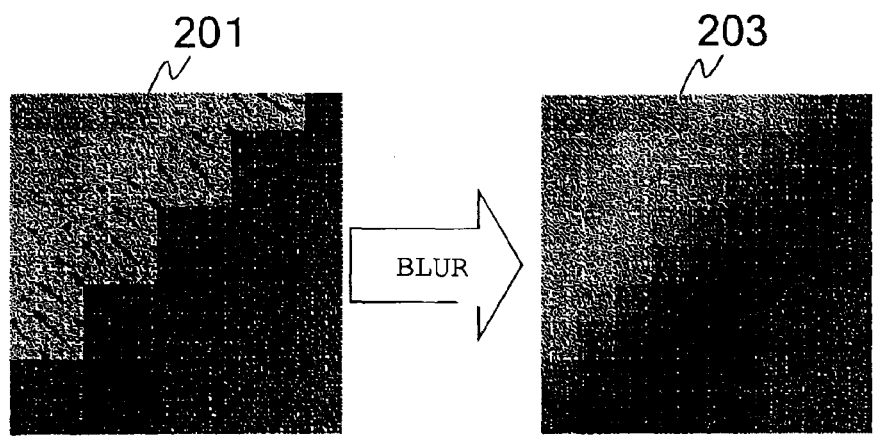
[FIG. 6] It depicts a view illustrating removal of jaggies.

Next, an assumption about jaggies will be described and an operation of the present invention will be described. First, the assumption about the jaggies will be described. FIG. 5 depicts a view illustrating an example of an input image and areas in the input image. In FIG. 5, areas 201 and 202 are illustrated by enlarging an area in an input image 200. A plurality of arrows illustrated in the areas 201 and 202 represents a brightness gradient direction and intensity in each pixel of the areas 201 and 202. Generally, jaggies are produced near an edge in, for example, an upscaled image. Further, characteristics of the human perception lie in being sensitive to an existence of jaggies at a portion at which edges in the same direction continue as in the area 201, and, meanwhile, having difficulty in perceiving jaggies at a portion at which there are jaggies of different directions as in the area 202. Hence, the present invention employs an assumption that pixels which form jaggies have certain brightness gradient intensities, and brightness gradients in an area near the pixels are uniform. Further, the image processing system according to the present invention generates an image from which jaggies are removed by deciding that such pixels are jaggy removal target pixels and updating pixel values of pixels of a corrected image corresponding to the jaggy removal target pixels. For example, a pixel of interest in the center of the area 201 is decided to be a jaggy removal target pixel, and the pixel value of the pixel of the corrected image corresponding to this jaggy removal target pixel is updated. When such decision is made per pixel of a processing target image and a jaggy removal target pixel is detected, jaggies are blurred by updating the pixel value of the pixel of the corrected image corresponding to this jaggy removal target pixel. As a result, as illustrated in FIG. 6, jaggies are removed in the area 203 of a corrected image corresponding to the area 201.

Figure 7:
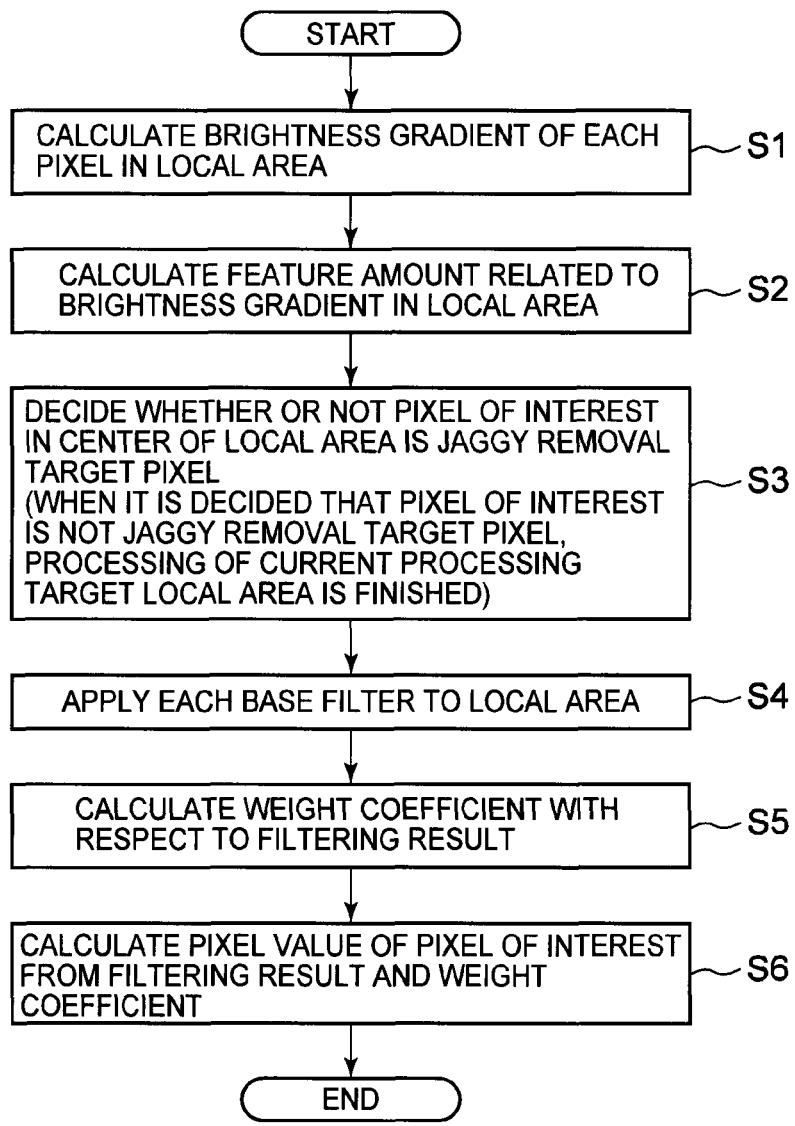
[FIG. 7] It depicts a flowchart illustrating an example of a processing process of the image processing system according to the first exemplary embodiment.

FIG. 7 depicts a flowchart illustrating an example of a processing process of the image processing system according to the first exemplary embodiment. First, a local area around each pixel of an input image is clipped, and each local area is inputted to the brightness gradient estimating means 11 and the base filter computing means 21. Further, the jaggy removal target pixel detecting means 10 and the jaggy removing means 20 perform the following processing per local area. In the following description, processing with respect to one local area will be described. In addition, a case will be described in this example where a corrected image of an initial state is stored in the memory of the image processing system.

In addition, the local area is clipped as an area which includes the number of pixels equal to or more than the number of coefficients included in a predetermined base filter.

The brightness gradient calculating means 11 calculates the brightness gradient of each pixel in the local area (step S1). More specifically, the brightness gradient calculating means 11 calculates a horizontal direction brightness gradient component and a vertical direction brightness gradient component. Hereinafter, when the coordinate of an arbitrary pixel is (x, y), the horizontal direction brightness gradient component in this pixel is represented as $I_x$ (x, y), and the vertical direction brightness gradient component in this pixel is represented as $I_y$ (x, y). Hence, the brightness gradient calculating means 11 calculates $I_x$ (x, y) and $I_y$ (x, y) per pixel of the local area.

To calculate $I_x$ (x, y) per pixel of the local area, the brightness gradient calculating means 11 applies a filter illustrated below to each pixel of the local area, and sets the application result as $I_x$ (x, y).

[Mathematical Formula 2]

$$\begin{matrix} -1 & 0 & 1 \\ -2 & 0 & 2 \\ -1 & 0 & 1 \end{matrix}$$

To calculate $I_y$ (x, y) per pixel of the local area, the brightness gradient calculating means 11 applies a filter illustrated below to each pixel of the local area, and sets the application result as $I_y$ (x, y).

[Mathematical Formula 3]

$$\begin{matrix} -1 & -2 & -1 \\ 0 & 0 & 0 \\ 1 & 2 & 1 \end{matrix}$$

In addition, the filter is an exemplary filter, and another filter may be used to calculate $I_x$ (x, y) and $I_y$ (x, y).

Next, the principal component analyzing means 12 analyzes the principal component of the brightness gradient of each pixel of the local area calculated in step S1, and calculates the feature amount related to the brightness gradient in the local area (step S2). More specifically, the principal component analyzing means 12 calculates two eigenvalues $\lambda_1$ and $\lambda_2$ (where $\lambda_1 > \lambda_2$ is true) related to brightness gradients of the local area, an eigenvector $v_1$ corresponding to the eigenvalue $\lambda_1$ and the eigenvector $v_2$ corresponding to the eigenvalue $\lambda_2$.

To calculate the eigenvalues $\lambda_1$ and $\lambda_2$ in step S2, the principal component analyzing means 12 only needs to calculate eigenvalues of a matrix A expressed in following equation (3), and sets the eigenvalues to $\lambda_1$ and $\lambda_2$. Meanwhile, $\lambda_1 > \lambda_2$ is true.

[Mathematical Formula 4]

$$A = \sum_{\bar{x},\bar{y} \in R} \begin{pmatrix} I_x(\bar{x}, \bar{y})^2 & I_x(\bar{x}, \bar{y}) \cdot I_y(\bar{x}, \bar{y}) \\ I_x(\bar{x}, \bar{y}) \cdot I_y(\bar{x}, \bar{y}) & I_y(\bar{x}, \bar{y}) \end{pmatrix} \quad \text{Equation (3)}$$

In equation (3), R represents a local area around the coordinate (x, y).

Further, in equation (3), $$\bar{x}, \bar{y} \quad \text{[Mathematical Formula 5]}$$

represents the coordinate in a local area R around the coordinate (x, y).

Furthermore, in equation (3), $$I_x(\bar{x}, \bar{y}) \quad \text{[Mathematical Formula 6]}$$

represents a horizontal direction brightness gradient component in the coordinate in the local area R around the coordinate (x, y). Still further, $$I_y(\bar{x}, \bar{y}) \quad \text{[Mathematical Formula 7]}$$

represents a vertical direction brightness gradient component in the coordinate in the local area R around the coordinate (x, y).

FIG. 8 depicts a view illustrating a feature amount obtained by analyzing principal components of the areas 201 and 202 as local areas illustrated in FIG. 5 in step 2. FIG. 8(a) illustrates eigenvalues $\lambda_1$ and $\lambda_2$ obtained by analyzing the principal component of a brightness gradient in the area 201 in which edges in the same direction continue, and eigenvectors $v_1$ and $v_2$ corresponding to these eigenvalues. Further, FIG. 8(b) illustrates eigenvalues $\lambda_1$ and $\lambda_2$ obtained by analyzing a principal component of a brightness gradient in the area 202 in which there are edges of different directions, and eigenvectors $v_1$ and $v_2$ corresponding to these eigenvalues. In FIG. 8, white arrows illustrated in the areas 201 and 202 represent the eigenvectors $v_1$ and $v_2$.

After step S2, the target pixel deciding means 13 decides whether or not a pixel of interest positioned in the center of the local area is a jaggy removal target pixel using the feature amounts $\lambda_1$ and $\lambda_2$, and $v_1$ and $v_2$ calculated in step S2 (step S3). Meanwhile, when brightness gradients in the local area are uniform as in the area 201 (see FIG. 5), while $\lambda_1$ takes a higher value, $\lambda_2$ takes a smaller value (see FIG. 8(a)). Meanwhile, when brightness gradients in the local area vary as in the area 202 (see FIG. 5), $\lambda_1$ and $\lambda_2$ both take higher values (see FIG. 8(b)). Hence, the target pixel deciding means 13 decides whether or not the pixel of interest in the center of the local area is a jaggy removal target pixel based on that the brightness gradient of the pixel of interest in the center of the local area is sufficiently great and $\lambda_1$ is sufficiently higher than $\lambda_2$.

More specifically, when the coordinate of the pixel of interest in the center of the local area is (x, y), if following equations (4) and (5) are true, the target pixel deciding means 13 decides that this pixel of interest is a jaggy removal target pixel and, if at least one of equations (4) and (5) is not true, decides that this pixel of interest is not a jaggy removal target pixel.

$$\{I_x(x,y)\}^2 + \{I_y(x,y)\}^2 > t_1 \quad \text{Equation (4)}$$

$$\lambda_1/\lambda_2 > t_2 \quad \text{Equation (5)}$$

$t_1$ in equation (4) and $t_2$ in equation (5) are both predetermined thresholds. That equation (4) is true means that the brightness gradient of the pixel of interest is sufficiently high. Further, that equation (5) is true means that $\lambda_1$ is sufficiently higher than $\lambda_2$.

When it is decided in step S3 that a pixel of interest is not a jaggy removal target pixel, the image processing system 1 finishes processing with respect to a current processing target local area, and starts processing with respect to a next local area. Meanwhile, when it is decided that the pixel of interest is a jaggy removal target pixel, the jaggy removing means 20 also performs processing subsequent to step S4 with respect to a current processing target local area.

The base filter computing means 21 individually applies a plurality of predetermined base filters to the inputted local area (step S4). Meanwhile, the base filters $G_1$, $G_2$ and $G_3$ (see FIG. 3) are set. The base filter computing means 21 performs processing of multiplying the coefficient of the base filter $G_1$ with a pixel value of a pixel of a local area associated with this coefficient per coefficient of the base filter $G_1$, and calculates a sum of multiplication results. As a result, a filtering result of the base filter $G_1$ is obtained. The base filter computing means 21 performs the same processing for the base filters $G_2$ and $G_3$.

Further, the filter weight calculating means 22 calculates the direction $\theta$ of the eigenvector $v_2$ calculated in step S2. The direction $\theta$ of $v_2$ needs to be calculated as a rotation angle from the reference direction (a horizontal rightward direction in this example) to the eigenvector $v_2$ in the counterclockwise direction. Further, the filter weight calculating means 22 calculates the weight coefficients $w_1$ to $w_3$ with respect to the base filters $G_1$ to $G_3$ by calculating equation (2) using the specific directions $\theta_1$, $\theta_2$ and $\theta_3$ (see FIG. 3) of the predetermined base filters $G_1$ to $G_3$ and the direction $\theta$ of the eigenvector $v_2$.

Subsequently, the weighted mean calculating means 23 calculates the pixel value of the pixel of interest using the filtering result of each base filter calculated in step S4 and the weight coefficient calculated in step S5, and determines this calculation result as a pixel value of a pixel of a corrected image corresponding to the pixel of interest. Further, the weighted mean calculating means 23 updates the pixel value of the pixel of the corrected image by a value of the calculation result (step S6). That is, by multiplying with $w_1$ the filtering result of the base filter $G_1$, multiplying with $w_2$ the filtering result of the base filter $G_2$, multiplying with $w_3$ the filtering result of the base filter $G_3$, the weighted mean calculating means 23 calculates the sum of multiplication results. Further, the weighted mean calculating means 23 updates the pixel value of the pixel of the corrected image corresponding to the pixel of interest in the center of this local area by the calculation result.

When step S6 is finished, processing of a current processing target local area is finished, processing of a next local area is started. Thus, processing subsequent to step S1 is performed with respect to each local area. As a result, when the pixel of interest in the center of each local area is a jaggy removal target pixel, the image processing system 1 updates the pixel value of the pixel of the corrected image corresponding to the pixel of interest, and obtains a corrected image from which jaggies are removed.

According to the first exemplary embodiment, a plurality of base filters is prepared in advance. Further, when the pixel of interest in the center of a local area is a jaggy removal target pixel, a result obtained by applying each base filter to the local area is weighted and a pixel value of a pixel of a corrected image corresponding to the pixel of interest is determined to remove jaggies. Hence, it is not necessary to calculate a filter (more specifically, a filter coefficient) for removing jaggies per local area, so that it is possible to perform processing of removing jaggies at a high speed.

Upon comparison between the present exemplary embodiment and the image processing device disclosed in Patent Literature 3, the image processing device disclosed in Patent Literature 3 needs to define a filter per predetermined range related to each pixel of interest and therefore the image processing device disclosed in Patent Literature 3 requires a longer processing time. Meanwhile, in the present exemplary embodiment, it is not necessary to calculate a filter for removing jaggies per local area as described above, and it is possible to perform processing of removing jaggies at a high speed.

Further, in the present exemplary embodiment, it is not necessary to prepare in advance jaggy patterns and jaggy correction patterns, so that it is possible to remove jaggies of various images. For example, it is possible to remove jaggies not only from binary images but also from gray scale images or color images. Further, it is also possible to remove jaggies produced in images upscaled by an unknown scaler.

That is, according to the present exemplary embodiment, it is possible to remove jaggies from binary images, gray scale images, color images and images upscaled by an unknown scaler at a high speed.

Second Exemplary Embodiment

Figure 9:
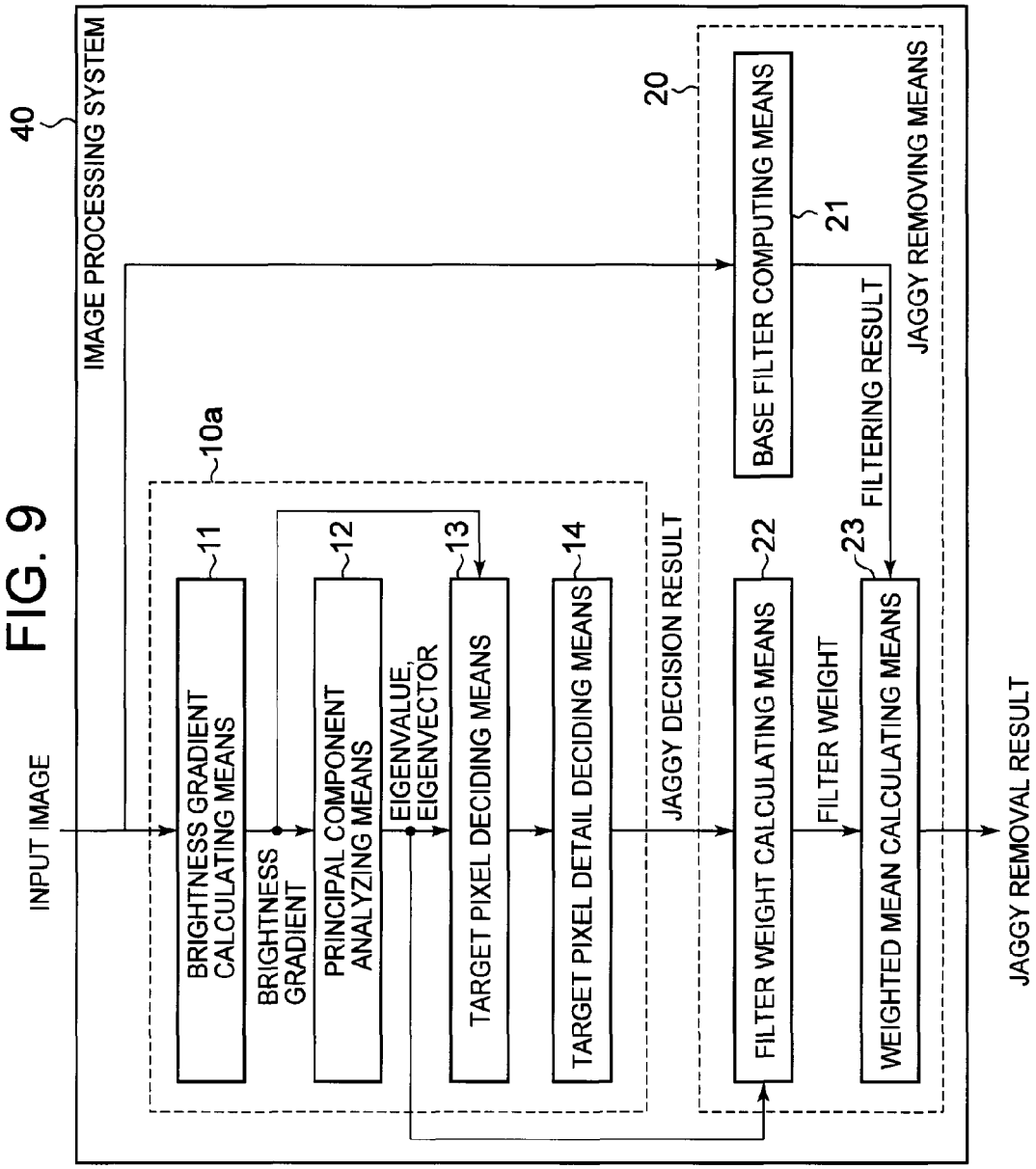
[FIG. 9] It depicts a block diagram illustrating an image processing system according to a second exemplary embodiment of the present invention.

FIG. 9 depicts a block diagram illustrating an image processing system according to a second exemplary embodiment of the present invention. The same components as those of the first exemplary embodiment will be assigned the same reference numerals as those in FIG. 1 and will not be described in detail.

An image processing system 40 according to the second exemplary embodiment has a jaggy removal target pixel detecting means 10, and a jaggy removing means 21.

Similar to a jaggy removal target pixel detecting means 10 (see FIG. 1) according to the first exemplary embodiment, the jaggy removal target pixel detecting means 10, decides whether or not a pixel of interest positioned in the center of a local area around each pixel of a processing target image is a jaggy removal target pixel. Meanwhile, the jaggy removal target pixel detecting means $10_a$ narrows down adequate pixels of interest as jaggy removal target pixels by further deciding whether or not local areas pixels of interest of which are decided to be jaggy removal target pixels satisfy predetermined conditions. That is, the jaggy removal target pixel detecting means $10_a$ according to the second exemplary embodiment narrows down jaggy removal target pixels by further deciding whether or not the pixels of interest which are decided to be jaggy removal target pixels satisfy predetermined conditions by the same method as that of the first exemplary embodiment. The conditions will be described below.

The jaggy removal target pixel detecting means $10_a$ includes a brightness gradient calculating means 11, a principal component analyzing means 12, a target pixel deciding means 13 and a target pixel detail deciding means 14. Operations of the brightness gradient calculating means 11, the principal component analyzing means 12 and the target pixel deciding means 13 are the same as those operations in the first exemplary embodiment, and will not be described.

The target pixel detail deciding means 14 performs the following processing of a local area the pixel of interest of which is decided to be a jaggy removal target pixel by the target pixel deciding means 13. The target pixel detail deciding means 14 samples (extracts) pixel values of pixels aligned in a direction of the eigenvector $v_2$ and pixels aligned in a direction of an inverse vector of the eigenvector $v_2$ from the pixel of interest which is the pixel in this local area and which is positioned in the center of this local area. The target pixel detail deciding means 14 transforms each pixel value into a frequency domain by performing, for example, FFT (Fast Fourier Transform) of each pixel value. When transforming the sampled pixel value into the frequency domain, the target pixel detail deciding means 14 decides whether or not the intensity equal to or more than a threshold can be obtained at a given frequency. Further, pixels of interest of local areas the pixels of interest of which are decided to be jaggy removal target pixels by the target pixel deciding means 13 and which satisfy the above conditions that the intensity equal to or more than the threshold is obtained at a given frequency are determined as jaggy removal target pixels. Meanwhile, when even local areas the pixels of interest of which are decided to be jaggy removal target pixels by the target pixel deciding means 13 do not satisfy the above conditions that the intensity equal to or more than the threshold is obtained at a given frequency, the pixels of interest which are decided to be the jaggy removal target pixels by the target pixel deciding means 13 are removed from the jaggy removal target pixels. According to the above processing, the target pixel detail deciding means 14 narrows down the pixels of interest which are decided to be jaggy removal target pixels by the target pixel deciding means 13.

Figure 10:
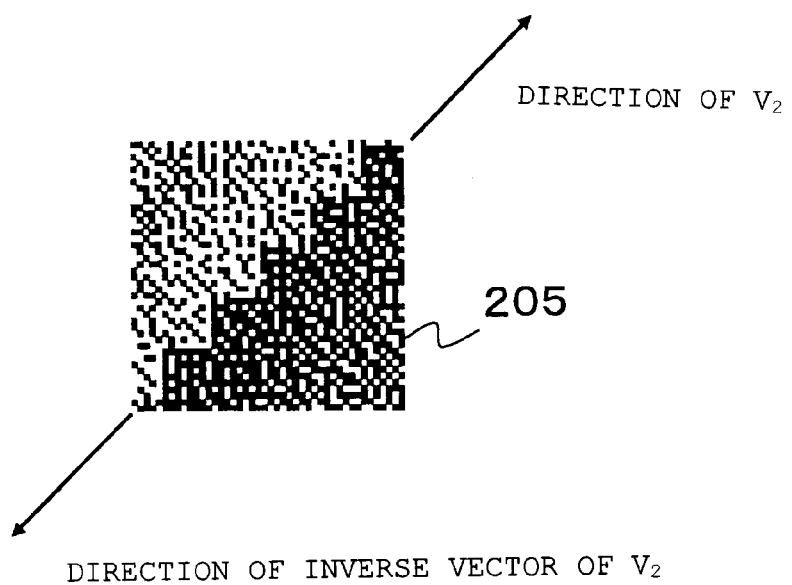
[FIG. 10] It depicts a schematic diagram illustrating a local area in which jaggier are produced, an eigenvector $v_2$ in this local area and an inverse vector of this eigenvector.
Figure 11:
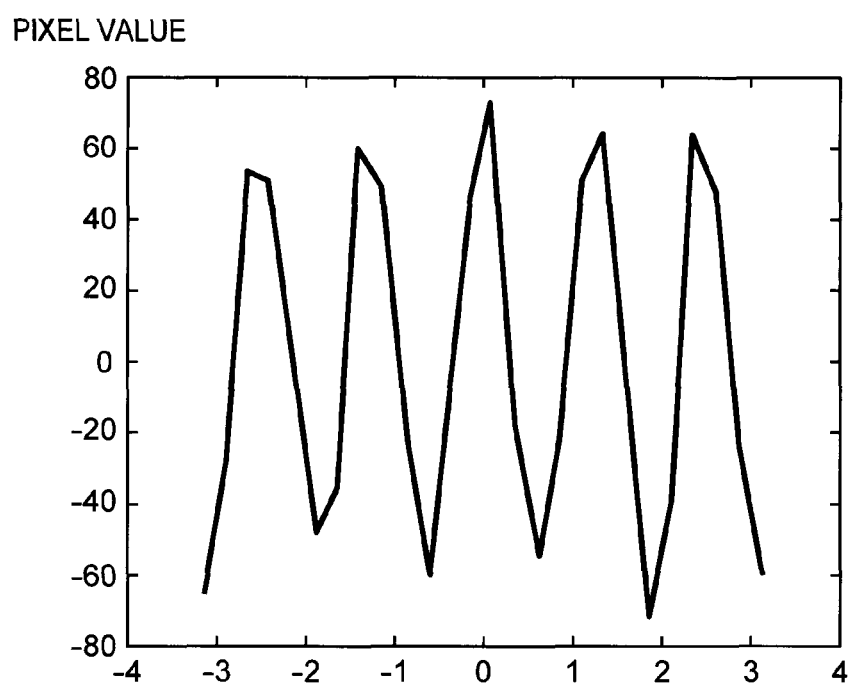
[FIG. 11] It depicts a schematic diagram illustrating changes of pixel values of a group of pixels aligned in a direction of the eigenvector $v_2$ from a pixel of interest and in a direction of an inverse vector of $v_2$.

According to the above processing of the target pixel detail deciding means 14, it is possible to select more adequate jaggy removal target pixels. This reason will be described. FIG. 10 depicts a schematic diagram illustrating a local area in which jaggies are produced, the eigenvector v 2 in this local area and an inverse vector of this eigenvector. The eigenvector $v_2$ is vertical to the eigenvector $v_1$ (not illustrated in FIG. 10) which represents a dominant brightness gradient direction in the local area. Hence, as illustrated in FIG. 10, in a group of pixels aligned in a direction of the eigenvector $v_2$ and in a direction of an inverse vector of $v_2$ from the pixel of interest in the local area in which jaggies are produced, pixel values repeat becoming high and low in an alignment order of pixels. FIG. 11 depicts a schematic diagram illustrating changes of pixel values of the group of pixel aligned in the direction of the eigenvector $v_2$ and in the direction of the inverse vector of the eigenvector $v_2$ from the pixel of interest. A horizontal axis illustrated in FIG. 11 indicates an alignment order of pixels aligned in the direction of the eigenvector $v_2$ and in the direction of the inverse vector of $v_2$ from the pixel of interest. Further, the center of the horizontal axis corresponds to the pixel of interest, and a rightward direction of the horizontal axis represents the alignment in the direction of the eigenvector $v_2$. Furthermore, a vertical axis illustrated in FIG. 11 indicates a pixel value. As illustrated in FIG. 11, in an alignment order of pixels aligned in the direction of the eigenvector $v_2$ and in the direction of the inverse vector of $v_2$ from the pixel of interest, the pixel values repeat becoming high and low.

Figure 12:
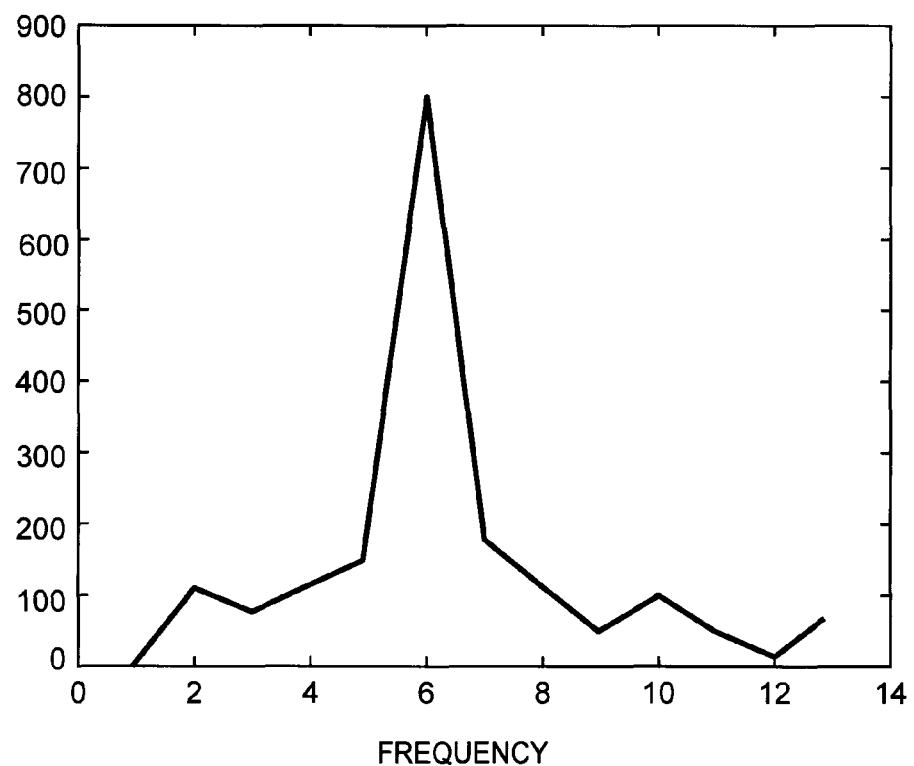
[FIG. 12] It depicts a schematic diagram illustrating a relationship between the frequency and the intensity when pixel values of pixels aligned in the direction of the eigenvector $v_2$ and the direction of the inverse vector of $v_2$ are sampled and transformed into a frequency domain.

FIG. 12 depicts a relationship between the frequency and the intensity when pixel values of pixels aligned in the direction of the eigenvector $v_2$ and in the direction of the inverse vector of $v_2$ from the pixel of interest are sampled and transformed into a frequency domain by forming, for example, FFT of the pixel values. Pixel values of pixels sampled as described above from a local area in which jaggies are produced repeat becoming high and low as illustrated in FIG. 11. Hence, as illustrated in FIG. 12, the intensity increases in the frequency domain at a given frequency. Hence, that the intensity increases at a given frequency means that features of jaggies that pixel values repeat becoming high and low in a group of pixels aligned in the direction of the eigenvector $v_2$ and in the direction of the inverse vector of $v_2$ from the pixel of interest of the local area. Consequently, when the conditions that the intensity at a given frequency is a threshold or more are satisfied, the pixel of interest of this local area is more adequate as a jaggy removal target pixel. In addition, "a give frequency" in the above conditions may be an arbitrary frequency. Alternatively, the given frequency may be an integral multiple of tan θ when the direction of the eigenvector $v_2$ is θ. That is, when the conditions that the intensity at an arbitrary frequency is a threshold or more are satisfied after transformation, for example, by FFT, the target pixel detail deciding means 14 may determine the pixel of interest of this local area as a jaggy removal target pixel. Further, when the conditions that the intensity at a frequency which is the integral multiple of tan θ is the threshold or more are satisfied, the target pixel detail deciding means 14 may determine the pixel of interest of this local area as a jaggy removal target pixel.

The jaggy removing means 20 includes a base filter computing means 21, a filter weight calculating means 22 and a weighted mean calculating means 23. A configuration and an operation of the jaggy removing means 20 (a base filter computing means 21, a filter weight calculating means 22 and a weighted mean calculating means 23) are the same as a configuration and an operation according to the first exemplary embodiment. Meanwhile, in the second exemplary embodiment, the jaggy removing means 20 performs processing targeting at a local area the pixel of interest of which is determined as a jaggy removal target pixel by the target pixel detail deciding means 14. When even the local area the pixel of interest of which is decided to be a jaggy removal target pixel by the target pixel deciding means 13 has the pixel of interest which is not determined as a jaggy removal target pixel by the target pixel detail deciding means 14, the local area is removed from a processing target of the jaggy removing means 20.

In the second exemplary embodiment, the jaggy removal target pixel detecting means $10_a$ (the brightness gradient calculating means 11, the principal component analyzing means 12, the target pixel deciding means 13 and the target pixel detail deciding means 14) and the jaggy removing means 20 (the base filter computing means 21, the filter weight calculating means 22 and the weighted mean calculating means 23) are realized by a computer which operates according to, for example, an image processing program. In this case, the computer only needs to read the image processing program, and operate as the jaggy removal target pixel detecting means $10_a$ (the brightness gradient calculating means 11, the principal component analyzing means 12, the target pixel deciding means 13 and the target pixel detail deciding means 14), and the jaggy removing means 20 (the base filter computing means 21, the filter weight calculating means 22 and the weighted mean calculating means 23).

Further, the jaggy removal target pixel detecting means $10_a$ and the jaggy removing means 20 may be realized by different units. Furthermore, the brightness gradient calculating means 11, the principal component analyzing means 12, the target pixel deciding means 13 and the target pixel detail deciding means 14 may be realized by different units. Still further, the base filter computing means 21, the filter weight calculating means 22 and the weighted mean calculating means 23 may also be realized by different units.

Figure 13:
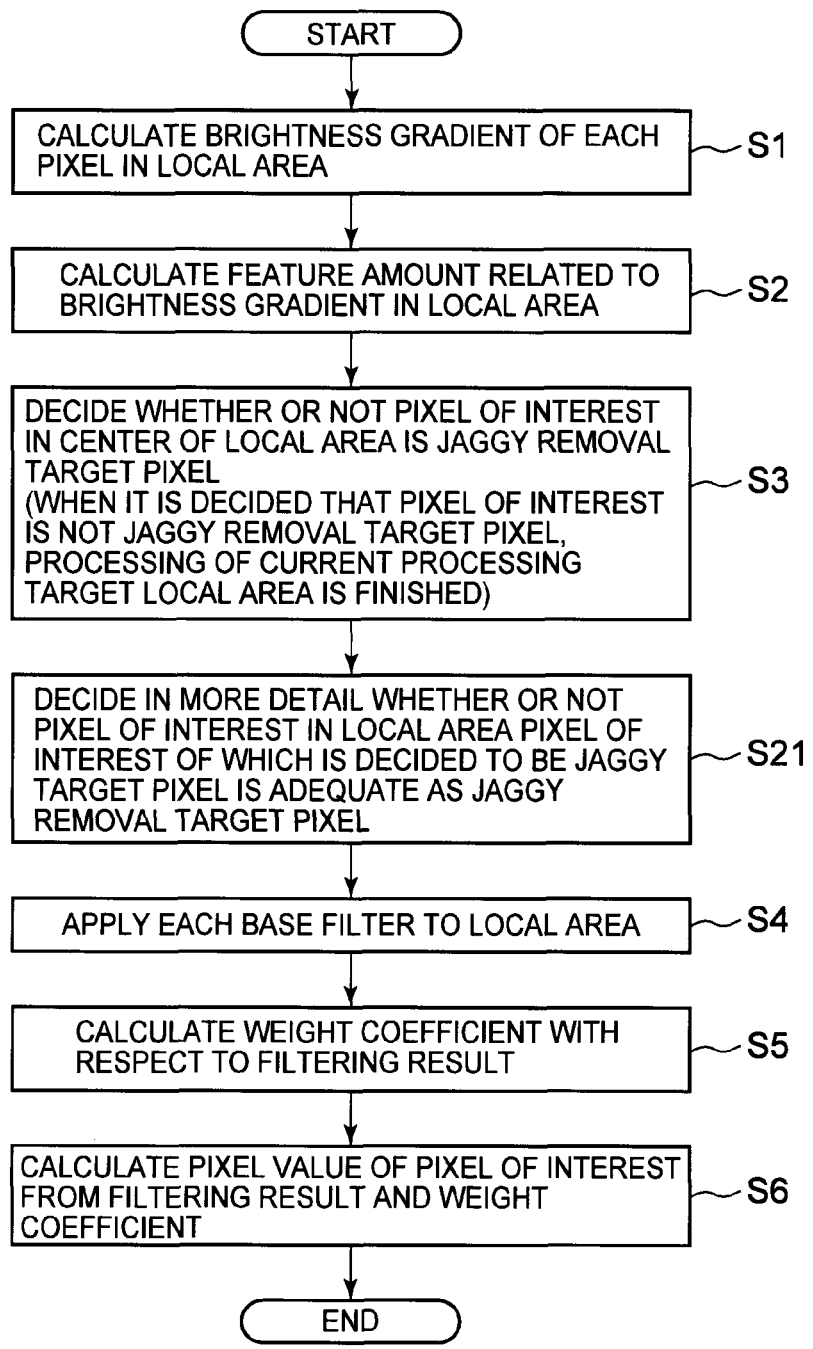
[FIG. 13] It depicts a flowchart illustrating an example of a processing process of the image processing system according to the second exemplary embodiment.

FIG. 13 depicts a flowchart illustrating an example of a processing process of the image processing system according to the second exemplary embodiment. The same processing as that of the first exemplary embodiment will be assigned the same reference numerals as those in FIG. 7 and will not be described in detail. Processing in steps S1 to S3 is the same as processing in steps S1 to S3 according to the first exemplary embodiment.

After step S3, the target pixel detail deciding means 14 decides in more detail whether or not a pixel of interest of a local area the pixel of interest of which is decided to be a jaggy removal target pixel by the target pixel deciding means 13 is adequate as a jaggy removal target pixel (step S21). That is, the target pixel detail deciding means 14 samples pixel values of pixels aligned in a direction of the eigenvector $v_2$ and pixels aligned in a direction of the inverse vector of the eigenvector $v_2$ from the pixel of interest which is the pixel in this local area the pixel of interest of which is decided to be a jaggy removal target pixel in step S3, and which is positioned in the center of this local area. In addition, the eigenvector $v_2$ has already been calculated in step S2. The target pixel detail deciding means 14 transforms each pixel value into a frequency domain by performing, for example, FFT of the sampled pixel value. Further, the target pixel detail deciding means 14 decides whether or not the intensity at a given frequency (for example, an arbitrary frequency or a frequency which is an integral multiple of tan θ) is the threshold or more, and, if the intensity at the frequency is the threshold or more, determines as a jaggy removal target pixel the pixel of interest which is decided in step S3 to be the jaggy removal target pixel. Meanwhile, when the intensity at a given frequency is less than a threshold, even the local area the pixel of interest of which is decided in step S3 to be the jaggy removal target pixel is removed from a target of processing subsequent to step S4.

Further, in the second exemplary embodiment, the jaggy removing means 20 performs processing in steps S4 to S6 with respect to the local area the pixel of interest of which is determined in step S21 as a jaggy removal target pixel.

As described above, the second exemplary embodiment differs from the first exemplary embodiment in that the target pixel detail deciding means 14 performs step S21 after step S3, and narrows down processing targets of steps S4 to S6. The other points are the same as those in the first exemplary embodiment.

In the first exemplary embodiment, from the view point that there are uniform brightness gradients in a local area, whether or not a pixel of interest is a jaggy removal target pixel is decided. In the second exemplary embodiment, whether or not a pixel of interest is more adequate as a jaggy removal target pixel is decided additionally based on a decision criterion that a change in pixel values of pixels aligned in the direction of the eigenvector $v_2$ and in the direction of the inverse vector of the vector $v_2$ from the pixel of interest matches with a jaggy feature in the local area, and the pixel of interest which is decided to be more adequate is determined as a jaggy removal target pixel. Further, steps S4 to S6 are performed targeting at a local area which includes this pixel of interest. Consequently, according to the second exemplary embodiment, in addition to the same effect as that of the first exemplary embodiment, it is also possible to provide an effect of more adequately detecting jaggy removal target pixels.

Third Exemplary Embodiment

Figure 14:
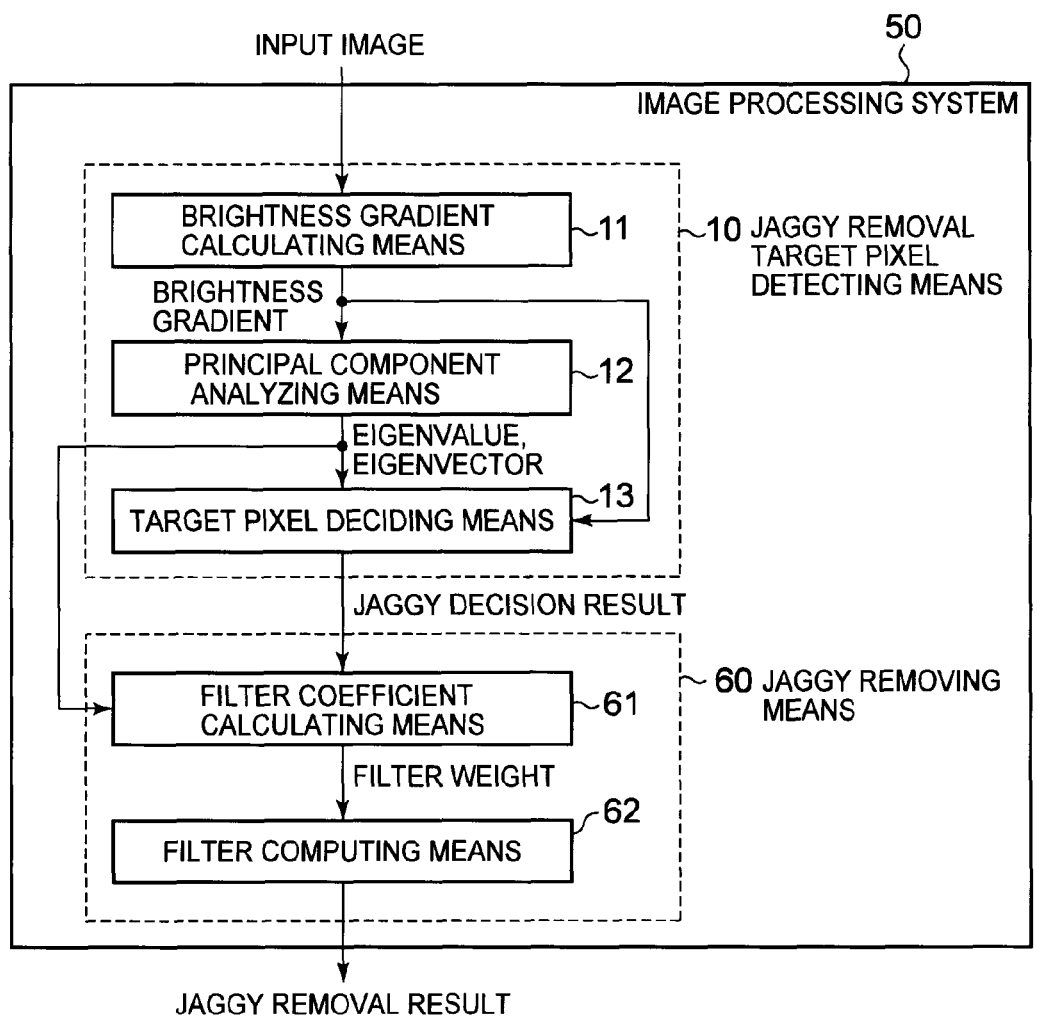
[FIG. 14] It depicts a block diagram illustrating an image processing system according to a third exemplary embodiment of the present invention.

FIG. 14 depicts a block diagram illustrating an image processing system according to a third exemplary embodiment of the present invention. The same components as those illustrated in FIG. 1 will be assigned the same reference numerals as those in FIG. 1 and will not be described in detail.

Also in the third exemplary embodiment, for example, the image processing system receives an input of the processing target image, and the image processing system stores duplication of this processing target image as an initial state of the corrected image in a memory (not illustrated). Further, the image processing system determines a pixel value of a pixel of a corrected image corresponding to a pixel which is decided to be a jaggy removal target pixel in a processing target image.

The image processing system 50 according to the third exemplary embodiment has a jaggy removal target pixel detecting means 10 and a jaggy removing means 60.

The jaggy removal target pixel detecting means 10 includes a brightness gradient calculating means 11, a principal component analyzing means 12 and a target pixel deciding means 13. The jaggy removal target pixel detecting means 10 (the brightness gradient calculating means 11, the principal component analyzing means 12 and the target pixel deciding means 13) is the same as that in the exemplary embodiments, and will not be described. In addition, similar to a configuration illustrated in FIG. 2, a local area clipping means 30 may be provided.

In the third exemplary embodiment, when a pixel of interest is decided to be a jaggy removal target pixel, the jaggy removing means 60 adaptively generates a jaggy removing filter with respect to this pixel of interest based on an eigenvalue and an eigenvector calculated for a local area around this pixel of interest. Further, the jaggy removing means 60 applies the jaggy removing filter to this local area. Furthermore, the jaggy removing means 60 determines this filtering result as a pixel value of a pixel of a corrected image corresponding to the pixel which is decided to be a jaggy removal target pixel. Still further, the pixel value of the pixel of the corrected image is updated by a value of the filtering result.

The jaggy removing means 60 includes a filter coefficient calculating means 61 and a filter computing means 62.

When the pixel of interest is decided to be a jaggy removal target pixel, the filter coefficient calculating means 61 calculates a filter coefficient of a blur filter which makes blur less in a direction of an eigenvector $v_1$ calculated for the local area around this pixel of interest and makes blur significant in a direction (i.e. a direction of an eigenvector $v_2$) orthogonal to $v_1$. That is, with this filter, the degree of blur in the direction of the eigenvector $v_2$ is more significant than the degree of blur in the direction of the eigenvector $v_1$.

The filter applying means 62 calculates a filtering result by applying to this local area a blur filter defined by a filter coefficient determined by the filter coefficient calculating means 61. Further, the pixel value of the pixel of the corrected image corresponding to the pixel of interest which is decided to be a jaggy removal target pixel is updated to a value of this filtering result.

The jaggy removal target pixel detecting means 10 (the brightness gradient calculating means 11, the principal component analyzing means 12 and the target pixel deciding means 13) and the jaggy removing means 60 (the filter coefficient computing means 61 and the filter computing means 62) are realized by, for example, a computer which operates according to the image processing program.

Further, the jaggy removal target pixel detecting means 10 and the jaggy removing means 60 may be realized by different units. Furthermore, the brightness gradient calculating means 11, the principal component analyzing means 12 and the target pixel deciding means 13 may be realized by different units, and the filter coefficient calculating means 61 and the filter computing means 62 may also be realized by different units.

Figure 15:
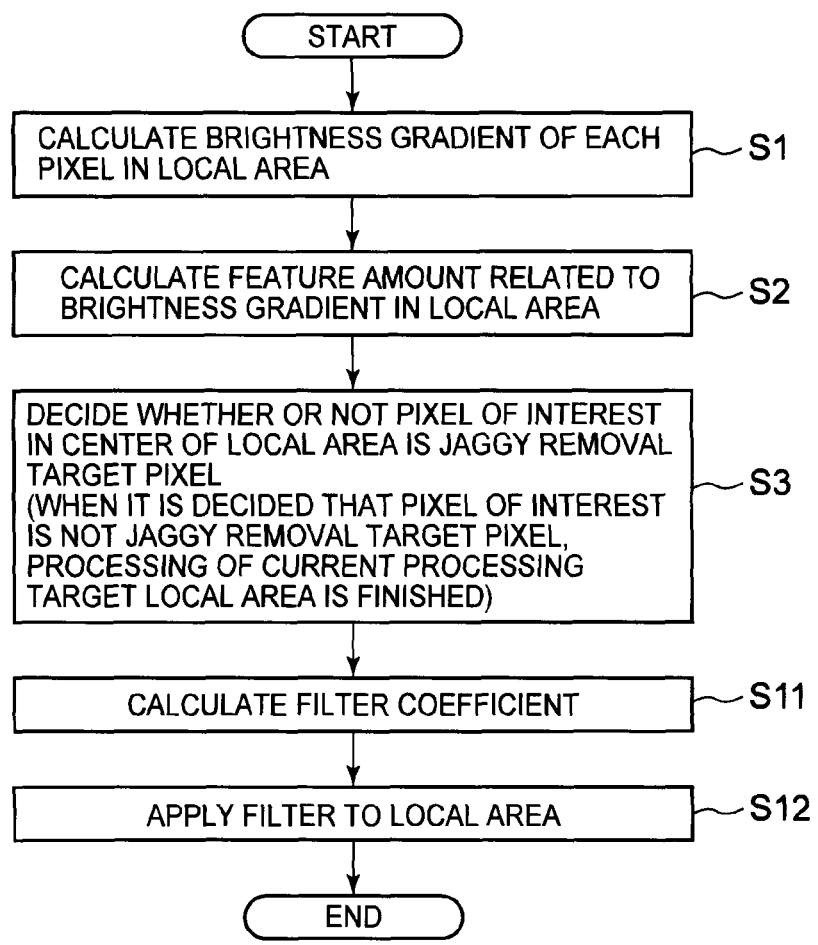
[FIG. 15] It depicts a flowchart illustrating an example of a processing process of the image processing system according to the third exemplary embodiment.

FIG. 15 depicts a flowchart illustrating an example of a processing process of the image processing system according to the third exemplary embodiment. Processing in steps S1 to S3 is the same as steps S1 to S3 (see FIG. 7) in the exemplary embodiments of the present invention and will not be described.

When it is decided that the pixel of interest is not a jaggy removal target pixel as a result of the processing in steps S1 to S3, the image processing system 50 finishes processing related to a current processing target local area, and starts processing related to a next local area. Meanwhile, when it is decided that the pixel of interest is a jaggy removal target pixel, the jaggy removing means 60 also performs processing in steps S11 and S12 with respect to a current processing target local area.

The filter coefficient calculating means 61 generates a jaggy removing filter using the eigenvalue and the eigenvector calculated in step S2 for the local area around the pixel of interest which is decided to be the jaggy removal target pixel. More specifically, the filter coefficient calculating means 61 calculates a filter coefficient of a blur filter which makes blur little in a direction of the eigenvector $v_1$ and makes blur significant in the direction of the eigenvector $v_2$ (step S11). Although a type of jaggy removing filters includes a Gaussian filter, a filter other than Gaussian filter may be adopted.

Figure 16:
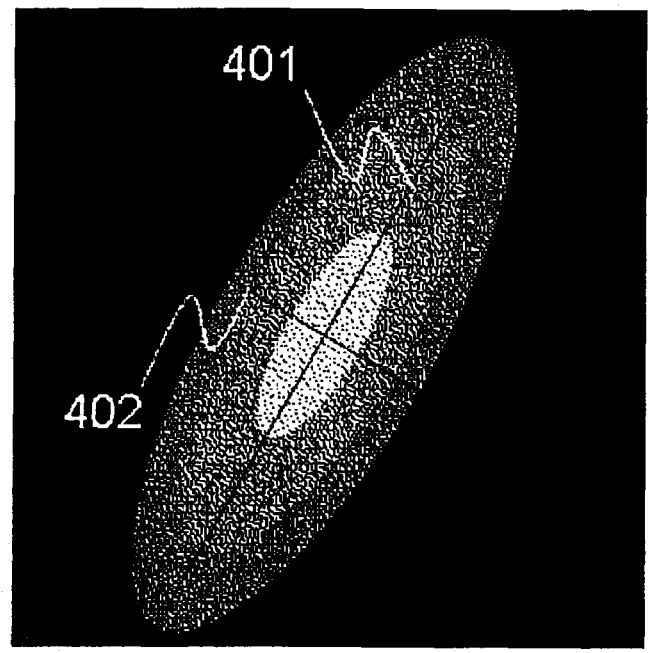
[FIG. 16] It depicts a view schematically illustrating a Gaussian filter.

FIG. 16 depicts a view schematically illustrating a Gaussian filter. In FIG. 16, a brighter portion has a greater weight (in other words, a value of a filter coefficient is higher). Further, FIG. 16 illustrates an example of a Gaussian filter associated with an area 201 illustrated in FIG. 8(*a*). A long axis 401 illustrated in FIG. 16 indicates the direction of the eigenvector $v_2$ (see FIG. 8(*a*)). Further, a short axis 402 indicates a direction of the eigenvector $v_1$ (see FIG. 8(*a*)). The filter coefficient calculating means 61 sets in advance dispersions $\sigma_1$ and $\sigma_2$ in the respective axis directions as values proportional to the eigenvalues $\lambda_1$ and $\lambda_2$. Although $\sigma_1$ and $\sigma_2$ are variable in this example, $\sigma_1$ and $\sigma_2$ may be fixed values. For example, $\sigma_1$ and $\sigma_2$ may be set as fixed values such as $\sigma_1=2.0$ and $\sigma_2=1.0$.

After step S11, the filter computing means 62 calculates a filtering result by applying a jaggy removing filter set in step S11 to a local area around the pixel of interest which is decided to be a jaggy removal target pixel. That is, processing of multiplying the pixel value of the pixel of a local area with a coefficient of a filter associated with this pixel is performed with respect to each pixel in the local area to calculate the sum of multiplication results. Further, the filter computing means 62 updates a pixel value of a pixel of a corrected image corresponding to a pixel of interest to a value of a filtering result (step S12).

In the third exemplary embodiment, it is not necessary to prepare in advance jaggy patterns and jaggy correction patterns, so that it is possible to remove jaggies of various images. For example, it is possible to remove jaggies not only from binary images but also from gray scale images or color images. Further, it is also possible to remove j aggies produced in images upscaled by an unknown scaler.

In the third exemplary embodiment, the jaggy removal target pixel detecting means 10 may be configured to include the target pixel detail deciding means 14 (see FIG. 9). That is, as a jaggy removal target pixel detecting means, the target pixel detail deciding means 14 (see FIG. 9) described in the second exemplary embodiment may be used. In this case, similar to the second exemplary embodiment, step S21 (see FIG. 13) after step S3 only needs to be executed. Further, the filter coefficient calculating means 61 only needs to calculate in step S11 a coefficient of a blur filter which is applied to a local area the center pixel of which is decided to be a jaggy removal target pixel by the target pixel deciding means 13 and which is decided to satisfy the conditions (the conditions described in the second exemplary embodiment) by the target pixel detail deciding means 14. Furthermore, the filter computing means only needs to execute step S12 by applying the blur filter to this local area. According to this configuration, it is also possible to provide an effect of more adequately detecting jaggy removal target pixels.

Figure 17:
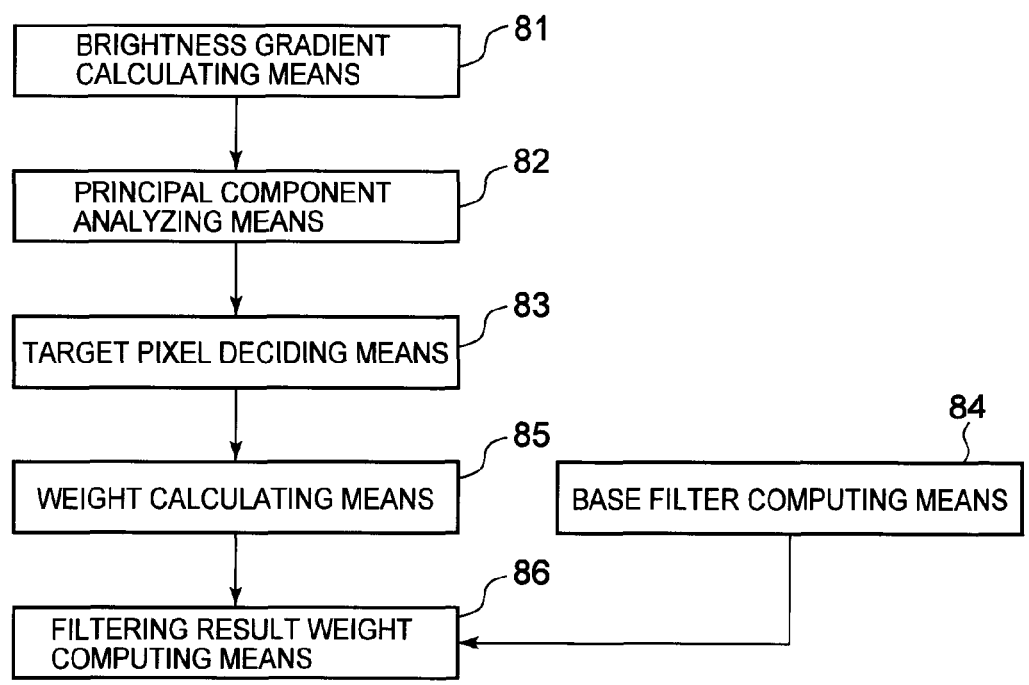
[FIG. 17] It depicts a block diagram illustrating an example of a minimum configuration of the present invention.

Next, a minimum configuration of the present invention will be described. FIG. 17 depicts a block diagram illustrating an example of a minimum configuration of the present invention. The image processing system according to the present invention has a brightness gradient calculating means 81, a principal component analyzing means 82, a target pixel deciding means 83, a base filter computing means 84, a weight calculating means 85 and a filtering result weight computing means 86.

The brightness gradient calculating means 81 (for example, the brightness gradient calculating means 11) calculates a brightness gradient of each pixel of a local area clipped from a processing target image.

The principal component analyzing means 82 (for example, the principal component analyzing means 12) analyzes a principal component of the brightness gradient of each pixel in the local area, and calculates a feature amount which represents a distribution of the brightness gradients.

Based on a brightness gradient of a center pixel of the local area and the feature amount calculated by the principal component analyzing means 82, the target pixel deciding means 83 (for example, the target pixel deciding means 13) decides whether or not the center pixel is a jaggy removal target pixel.

When the center pixel of the local area is decided to be a jaggy removal target pixel, the base filter computing means 84 (for example, the base filter computing means 21) applies a plurality of types of predetermined base filters to this local area.

The weight calculating means 85 (for example, the filter weight calculating means 22) calculates weights with respect to a plurality of types of base filters based on the feature amount calculated by the principal component analyzing means 82.

Based on results obtained by applying a plurality of types of base filters to the local area and the weights with respect to a plurality of types of base filters, the filtering result weight computing means 86 (for example, weighted mean calculating means 23) determines a pixel value of a pixel corresponding to the center pixel of this local area in a corrected image created as an image obtained by correcting a processing target image.

According to the above configuration, it is possible to remove jaggies at a high speed not only from binary images but also from gray scale images, color images and images upscaled by an unknown scaler.

Further a configuration may be employed in which the principal component analyzing means 82 calculates a first eigenvector (for example, $v_1$) which represents a dominant brightness gradient direction in the local area and a second eigenvector (for example, $v_2$) which is vertical to the first eigenvector as the feature amount which represents the distribution of brightness gradients; which includes a target pixel detail deciding means (for example, a target pixel detail deciding means 14) which decides whether or not the local area the center pixel of which is decided to be a jaggy removal target by the target pixel deciding means 83 satisfy conditions that brightness values of pixels aligned in the direction of the second eigenvector from the center pixel and the pixels aligned in the direction of the inverse vector of the second eigenvector from the center pixel repeat becoming high and low, and in which the base filter computing means 84 applies a plurality of types of predetermined base filters to the local area the center pixel of which is decided to be a jaggy removal target pixel by the target pixel deciding means 83 and which is decided to satisfy the conditions by the target pixel detail deciding means.

Figure 18:
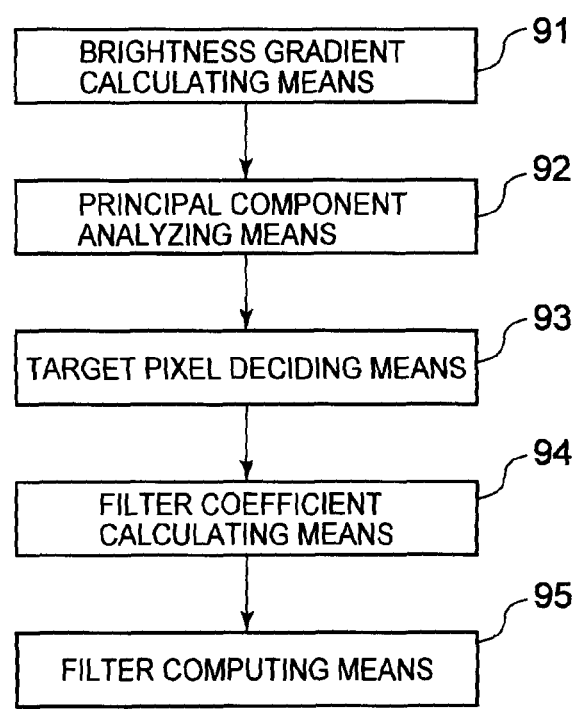
[FIG. 18] It depicts a block diagram illustrating another example of a minimum configuration of the present invention.

FIG. 18 depicts a block diagram illustrating another example of a minimum configuration of the present invention. As illustrated in FIG. 18, an image processing system according to the present invention may employ a configuration including a brightness gradient calculating means 91, a principal component analyzing means 92, a target pixel deciding means 93, a filter coefficient calculating means 94 and a filter computing means 95.

The brightness gradient calculating means 91 (for example, the brightness gradient calculating means 11) calculates a brightness gradient of each pixel of a local area clipped from a processing target image.

The principal component analyzing means 92 (for example, the principal component analyzing means 12) analyzes a principal component of a brightness gradient of each pixel in the local area, and calculates a first eigenvector (for example, $v_1$) which represents a dominant brightness gradient direction in the local area and a second eigenvector (for example, $v_2$) which is vertical to the first eigenvector as the feature amount which represents the distribution of the brightness gradients.

Based on a brightness gradient of a center pixel of the local area and the feature amount calculated by the principal component analyzing means 92, the target pixel deciding means 93 (for example, the target pixel deciding means 13) decides whether or not the center pixel is a jaggy removal target pixel.

When the center pixel of the local area is decided to be the jaggy removal target pixel, a filter coefficient calculating means 94 (for example, the filter coefficient calculating means 61) calculates a coefficient of a blur filter which makes a degree of blur in the direction of the second eigenvector more significant than a degree of blur in a direction of the first eigenvector.

By applying the blur filter to the local area the center pixel of which is decided to be the jaggy removal target pixel, a filter computing means 95 (for example, the filter computing mean 62) determines a pixel value of a pixel which is included in a corrected image created as an image by correcting a processing target image and which corresponds to the center pixel of the local area.

According to the above configuration, it is possible to remove jaggies not only from binary images but also from gray scale images, color images and images upscaled by an unknown scaler.

Further, a configuration may be employed which includes a target pixel detail deciding means (for example, a target pixel detail deciding means 14) which decides whether or not the local area the center pixel of which is decided to be a jaggy removal target pixel by the target pixel deciding means 93 satisfy conditions that brightness values of pixels aligned in the direction of the second eigenvector from the center pixel and the pixels aligned in the direction of the inverse vector of the second eigenvector from the center pixel repeat becoming high and low, in which the filter coefficient calculating means 94 calculates a coefficient of a blur filter which makes a degree of blur in the direction of the second eigenvector more significant than a degree of blur in a direction of the first eigenvector as a coefficient of the filter applied to the local area the center pixel of which is decided to be the jaggy removal target pixel by the target pixel deciding means 93 and which is decided to satisfy the conditions by the target pixel detail deciding means, and, which, by applying the blur filter to the local area, the filter computing means 95 determines a pixel value of a pixel which is included in a corrected image and which corresponds to the center pixel of the local area.

Part or the entirety of the above exemplary embodiment can be described as in the following notes and, however, is by no means limited to the following notes.

(Supplementary note 1) An image processing system has: a brightness gradient calculating unit which calculates a brightness gradient of each pixel in a local area clipped from a processing target image; a principal component analyzing unit which analyzes a principal component of the brightness gradient of each pixel in the local area, and calculates a feature amount which represents a distribution of brightness gradients; a target pixel deciding unit which, based on a brightness gradient of a center pixel of the local area and the feature amount calculated by the principal component analyzing unit, decides whether or not the center pixel is a jaggy removal target pixel; a base filter computing unit which, when the center pixel of the local area is decided to be the jaggy removal target pixel, applies a plurality of types of predetermined base filters to the local area; a weight calculating unit which calculates a weight with respect to the plurality of types of base filters based on the feature amount calculated by the principal component analyzing unit; and a filtering result weight computing unit which, based on a result that the plurality of types of base filters is applied to the local area and the weight with respect to the plurality of types of base filters, determines a pixel value of a pixel which is included in a corrected image created as an image by correcting a processing target image and which corresponds to the center pixel of the local area.

(Supplementary note 2) In the image processing system according to Supplementary note 1, the principal component analyzing unit calculates a first eigenvector which represents a dominant brightness gradient direction in the local area and a second eigenvector which is vertical to the first eigenvector as the feature amount which represents the distribution of the brightness gradients, the image processing system has a target pixel detail deciding unit which decides whether or not the local area the center pixel of which is decided to be the jaggy removal target pixel by the target pixel deciding unit satisfies conditions that brightness values of pixels aligned in a direction of the second eigenvector from the center pixel and pixels aligned in a direction of an inverse vector of the second eigenvector from the center pixel repeat becoming high and low, and the base filter computing unit applies the plurality of types of predetermined base filters to a local area a center pixel of which is decided to be the jaggy removal target pixel by the target pixel deciding unit and which is decided to satisfy the conditions by the target pixel detail deciding unit.

(Supplementary note 3) An image processing system has: a brightness gradient calculating unit which calculates a brightness gradient of each pixel in a local area clipped from a processing target image; a principal component analyzing unit which analyzes a principal component of a brightness gradient of each pixel in the local area, and calculates a first eigenvector which represents a dominant brightness gradient direction in the local area and a second eigenvector which is vertical to the first eigenvector as the feature amount which represents the distribution of brightness gradients; a target pixel deciding unit which, based on a brightness gradient of a center pixel of the local area and the feature amount calculated by the principal component analyzing unit, decides whether or not the center pixel is a jaggy removal target pixel; a filter coefficient calculating unit which, when the center pixel of the local area is decided to be the jaggy removal target pixel, calculates a coefficient of a blur filter which makes a degree of blur in the direction of the second eigenvector more significant than a degree of blur in a direction of the first eigenvector; and a filter computing unit which, by applying the blur filter to the local area the center pixel of which is decided to be the jaggy removal target pixel, determines a pixel value of a pixel which is included in a corrected image created as an image by correcting a processing target image and which corresponds to the center pixel of the local area.

(Supplementary note 4) The image processing system according to Supplementary note 3, further has: a target pixel detail deciding unit which decides whether or not the local area the center pixel of which is decided to be the jaggy removal target pixel by the target pixel deciding unit satisfies conditions that brightness values of pixels aligned in a direction of the second eigenvector from the center pixel and pixels aligned in a direction of an inverse vector of the second eigenvector from the center pixel repeat becoming high and low, and a filter coefficient calculating unit calculates a coefficient of a blur filter which makes a degree of blur in the direction of the second eigenvector more significant than a degree of blur in a direction of the first eigenvector as a coefficient of the filter applied to the local area the center pixel of which is decided to be the jaggy removal target pixel by the target pixel deciding unit and which is decided to satisfy the conditions by the target pixel detail deciding unit, and the filter computing unit determines a pixel value of the pixel which is included in the corrected image and which corresponds to the center pixel of the local area by applying the blur filter to the local area.

This application claims priority to Japanese Patent Application No. 2011-009837 filed on Jan. 20, 2011, the entire contents of which are incorporated by reference herein.

Although the present invention has been described with reference to the exemplary embodiments, the present invention is by no means limited to the above exemplary embodiments. The configurations and the details of the present invention can be variously changed within a scope of the present invention which one of ordinary skill in art can understand.

INDUSTRIAL APPLICABILITY

The present invention is suitably applied to an image processing system which removes jaggies in an image.

REFERENCE SIGNS LIST

1 Image processing system
10 Jaggy removal target pixel detecting means
11 Brightness gradient calculating means
12 Principal component analyzing means
13 Target pixel deciding means
14 Target pixel detail deciding means
20 Jaggy removing means
21 Base filter computing means
22 Filter weight calculating means
23 Weighted mean calculating means

The invention claimed is:

1. An image processing system comprising:
a brightness gradient calculating unit which calculates a brightness gradient of each pixel in a local area clipped from a processing target image;
a principal component analyzing unit which analyzes a principal component of the brightness gradient of each pixel in the local area, and calculates a feature amount which represents a distribution of brightness gradients;
a target pixel deciding unit which, based on a brightness gradient of a center pixel of the local area and the feature amount calculated by the principal component analyzing unit, decides whether or not the center pixel is a jaggy removal target pixel;
a target pixel detail deciding unit which transforms each pixel value of each pixel, which is sampled based on a pixel decided as the jaggy removal target pixel by the target pixel deciding unit, into a frequency domain, and decides whether or not intensity equal to or more than a threshold can be obtained at an arbitrary frequency;
a base filter computing unit which, when the center pixel of the local area is decided to be the jaggy removal target pixel, applies a plurality of types of predetermined base filters to the local area;
a weight calculating unit which calculates a weight with respect to the plurality of types of base filters based on the feature amount calculated by the principal component analyzing unit; and
a filtering result weight computing unit which, based on a result that the plurality of types of base filters is applied to the local area and the weight with respect to the plurality of types of base filters, determines a pixel value of a pixel which is included in a corrected image created as an image by correcting a processing target image and which corresponds to the center pixel of the local area.

2. The image processing system according to claim 1, wherein:
the principal component analyzing unit calculates a first eigenvector which represents a dominant brightness gradient direction in the local area and a second eigenvector which is vertical to the first eigenvector as the feature amount which represents the distribution of brightness gradients;
the target pixel detail deciding unit decides whether or not the local area the center pixel of which is decided to be the jaggy removal target pixel by the target pixel deciding unit satisfies conditions that brightness values of pixels aligned in a direction of the second eigenvector from the center pixel and pixels aligned in a direction of an inverse vector of the second eigenvector from the center pixel repeat becoming high and low; and
the base filter computing unit applies the plurality of types of predetermined base filters to a local area a center pixel of which is decided to be the jaggy removal target pixel by the target pixel deciding unit and which is decided to satisfy the conditions by the target pixel detail deciding unit.

3. An image processing method comprising:
calculating a brightness gradient of each pixel in a local area clipped from a processing target image;
analyzing a principal component of the brightness gradient of each pixel in the local area, and calculating a feature amount which represents a distribution of brightness gradients;
based on a brightness gradient of a center pixel of the local area and the feature amount, deciding whether or not the center pixel is a jaggy removal target pixel;
transforming each pixel value of each pixel, which is sampled based on a pixel decided as the jaggy removal target pixel, into a frequency domain, and deciding whether or not intensity equal to or more than a threshold can be obtained at an arbitrary frequency;
when the center pixel of the local area is decided to be the jaggy removal target pixel, applying a plurality of types of predetermined base filters to the local area;
calculating a weight with respect to the plurality of types of base filters based on the feature amount; and based on a result that the plurality of types of base filters is applied to the local area and the weight with respect to the plurality of types of base filters, determining a pixel value of a pixel which is included in a corrected image created as an image by correcting a processing target image and which corresponds to the center pixel of the local area.

4. A non-transitory computer readable information recording medium storing an image processing program causing a computer to execute:

brightness gradient calculation processing of calculating a brightness gradient of each pixel in a local area clipped from a processing target image;

principal component analysis processing of analyzing a principal component of the brightness gradient of each pixel in the local area, and calculating a feature amount which represents a distribution of brightness gradients;

target pixel decision processing of, based on a brightness gradient of a center pixel of the local area and the feature amount calculated in the principal component analysis processing, deciding whether or not the center pixel is a jaggy removal target pixel;

target pixel detail decision processing of transforming each pixel value of each pixel, which is sampled based on a pixel decided as the jaggy removal target pixel in the target pixel decision processing, into a frequency domain, and deciding whether or not intensity equal to or more than a threshold can be obtained at an arbitrary frequency;

base filter computation processing of, when the center pixel of the local area is decided to be the jaggy removal target pixel, applying a plurality of types of predetermined base filters to the local area;

weight calculation processing of calculating a weight with respect to the plurality of types of base filters based on the feature amount calculated in the principal component analysis processing; and filtering result weight computation processing of, based on a result that the plurality of types of base filters is applied to the local area and the weight with respect to the plurality of types of base filters, determining a pixel value of a pixel which is included in a corrected image created as an image by correcting a processing target image and which corresponds to the center pixel of the local area.

* * * * *